(12) United States Patent
Kanno et al.

(10) Patent No.: US 11,269,558 B2
(45) Date of Patent: Mar. 8, 2022

(54) MEMORY SYSTEM AND METHOD OF CONTROLLING NONVOLATILE MEMORY

(71) Applicant: Kioxia Corporation, Tokyo (JP)

(72) Inventors: Shinichi Kanno, Ota (JP); Koichi Nagai, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/017,435

(22) Filed: Sep. 10, 2020

(65) Prior Publication Data

US 2021/0223994 A1 Jul. 22, 2021

(30) Foreign Application Priority Data

Jan. 16, 2020 (JP) .............................. JP2020-005285

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/0629* (2013.01); *G06F 3/0644* (2013.01); *G06F 3/0653* (2013.01); *G06F 3/0656* (2013.01); *G06F 3/0679* (2013.01)

(58) Field of Classification Search
CPC ....... G06F 3/061; G06F 3/0679; G06F 3/0659
See application file for complete search history.

(56) References Cited

U.S. PATENT DOCUMENTS

| | | |
|---|---|---|
| 2016/0018998 A1 | 1/2016 | Mohan et al. |
| 2017/0024137 A1 | 1/2017 | Kanno |
| 2017/0123721 A1* | 5/2017 | Sela ...................... G06F 3/0611 |
| 2017/0220267 A1* | 8/2017 | Neelakanta ........... G06F 3/0616 |
| 2018/0039417 A1 | 2/2018 | Kanno |
| 2019/0087323 A1 | 3/2019 | Kanno et al. |
| 2019/0095123 A1 | 3/2019 | Lin |
| 2019/0146907 A1 | 5/2019 | Frolikov |
| 2019/0179660 A1 | 6/2019 | Qiu et al. |
| 2019/0332316 A1* | 10/2019 | Kanno ................ G06F 12/1009 |
| 2020/0241798 A1* | 7/2020 | Kanno .................... G06F 3/064 |
| 2021/0049114 A1* | 2/2021 | Kim ........................ G06F 13/28 |

FOREIGN PATENT DOCUMENTS

| | | |
|---|---|---|
| JP | 2019-179571 A | 10/2019 |
| JP | 2019-191909 A | 10/2019 |

* cited by examiner

*Primary Examiner* — Edward J Dudek, Jr.
(74) *Attorney, Agent, or Firm* — Oblon, McClelland, Maier & Neustadt, L.L.P.

(57) ABSTRACT

According to one embodiment, a controller of a memory system reorders a plurality of first write commands in an order in which writing within a first zone is executed sequentially from a next write location within the first zone. The controller transfers a plurality of write data associated with the plurality of first write commands reordered from a write buffer of a host to an internal buffer in a same order as the order of the plurality of first write commands reordered, and writes the plurality of write data transferred to the internal buffer to a first storage region managed as the first zone.

20 Claims, 20 Drawing Sheets

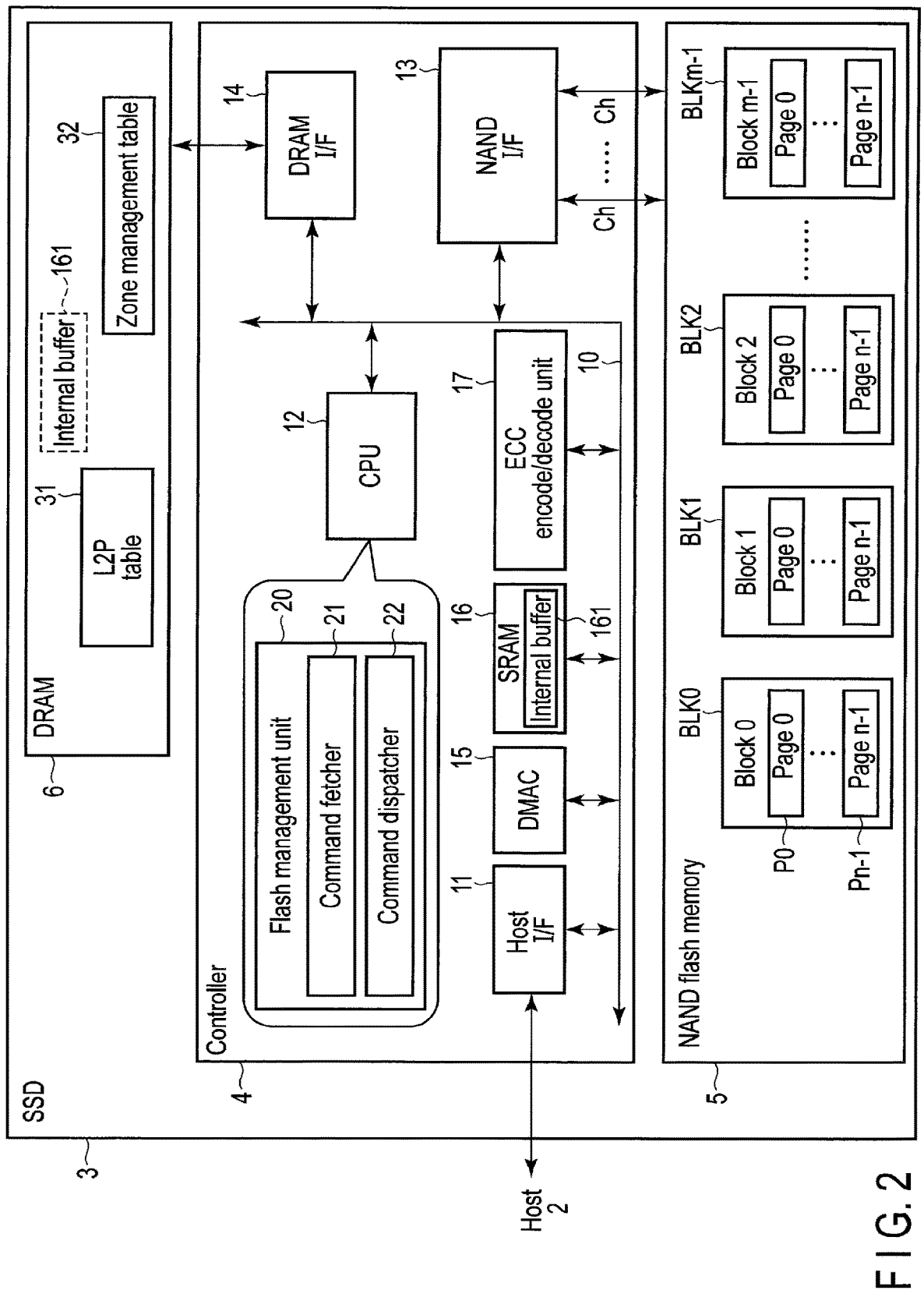
F I G. 2

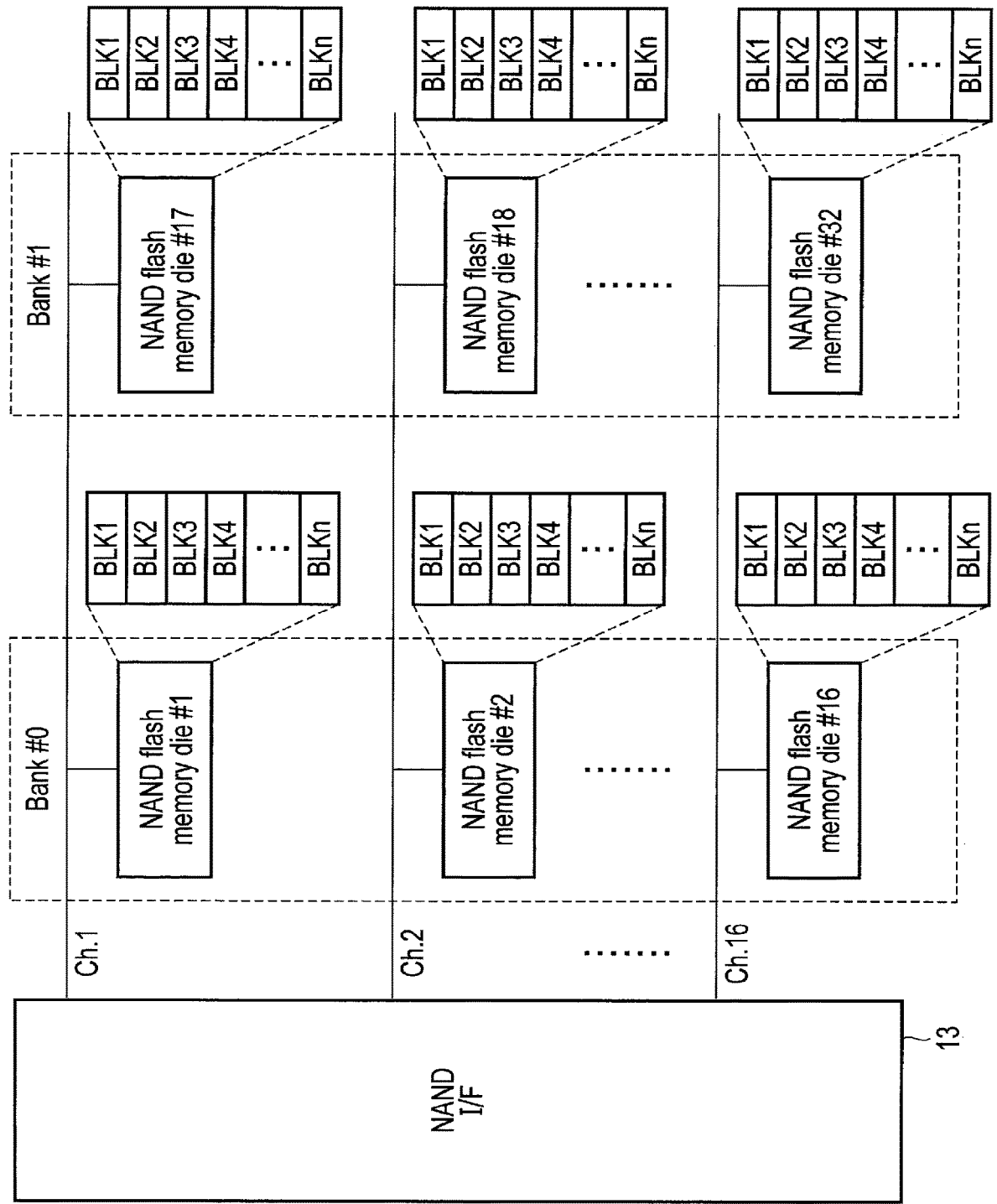
F I G. 4

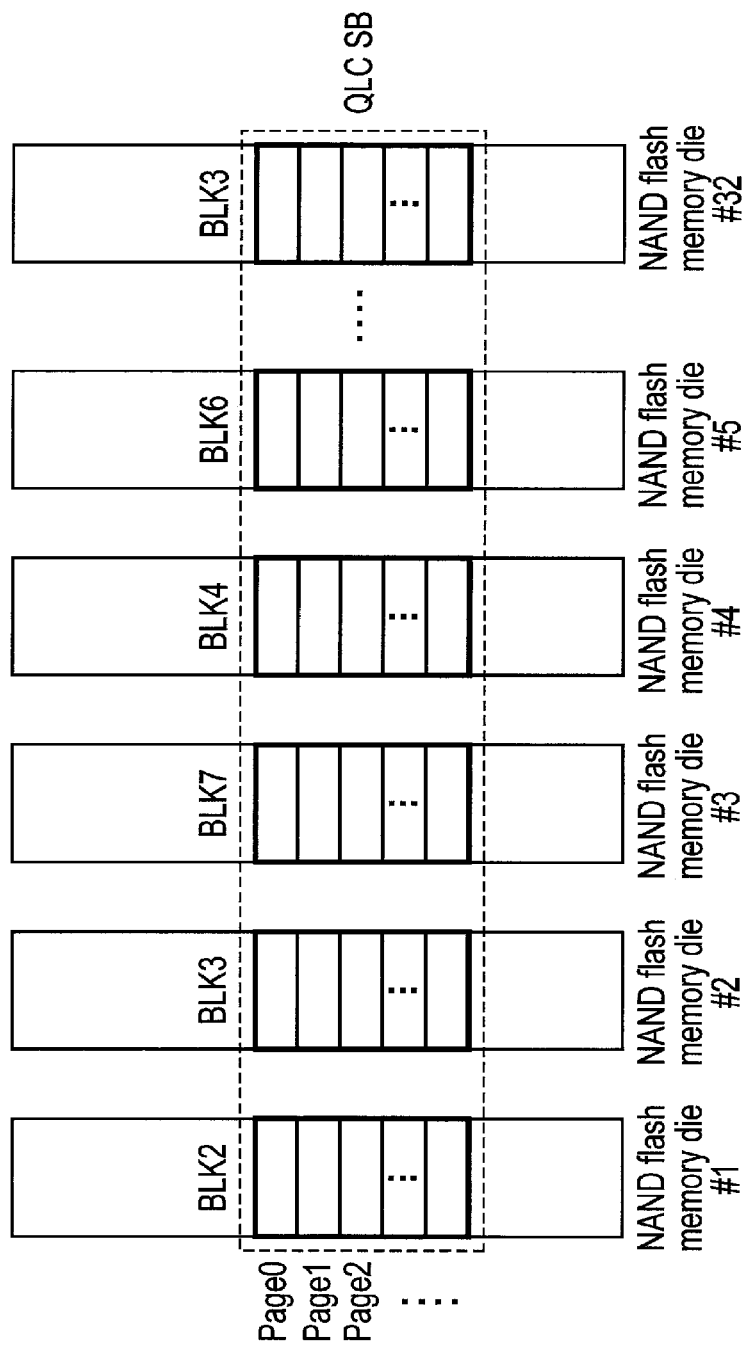
F I G. 5

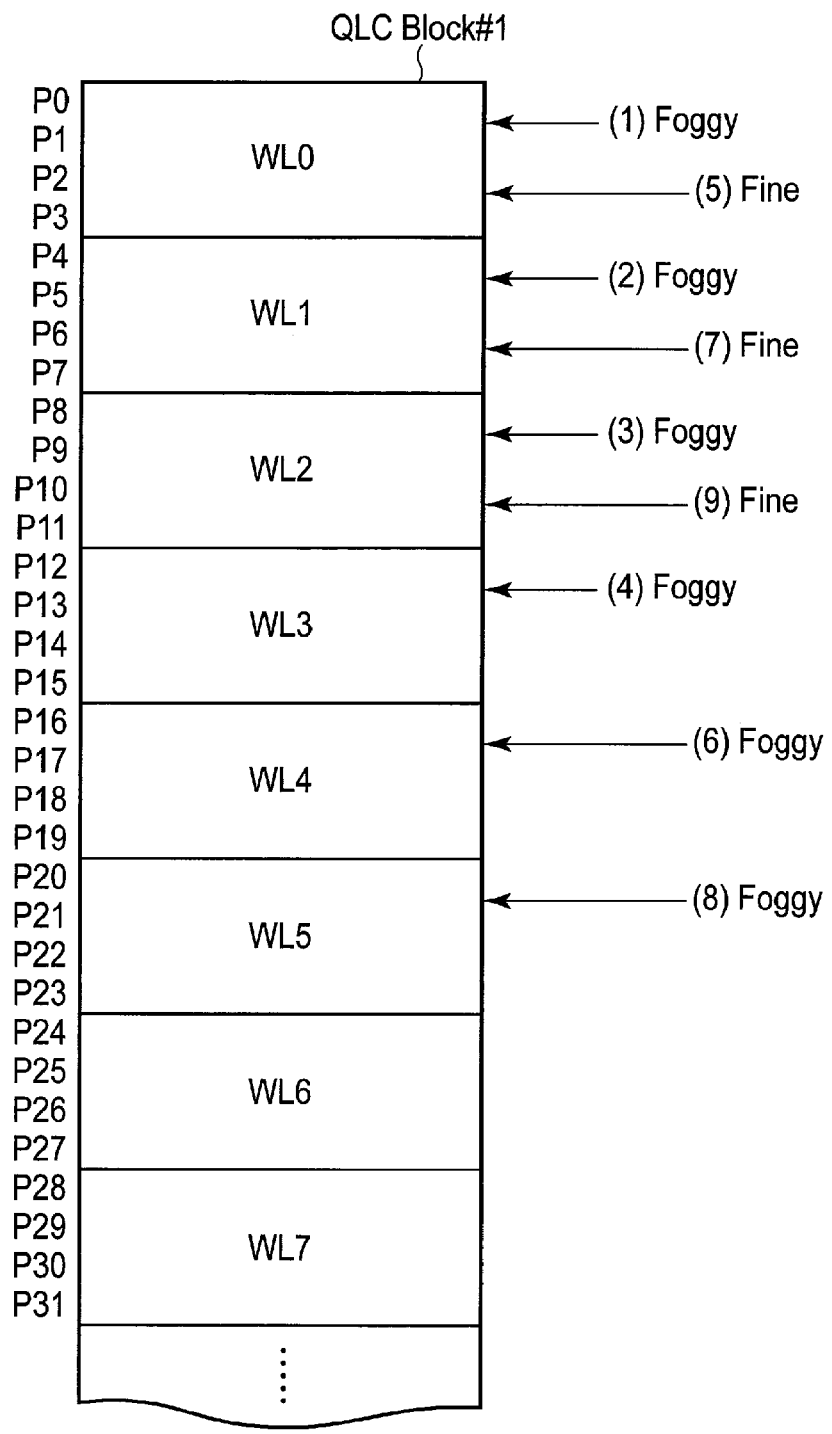
F I G. 6

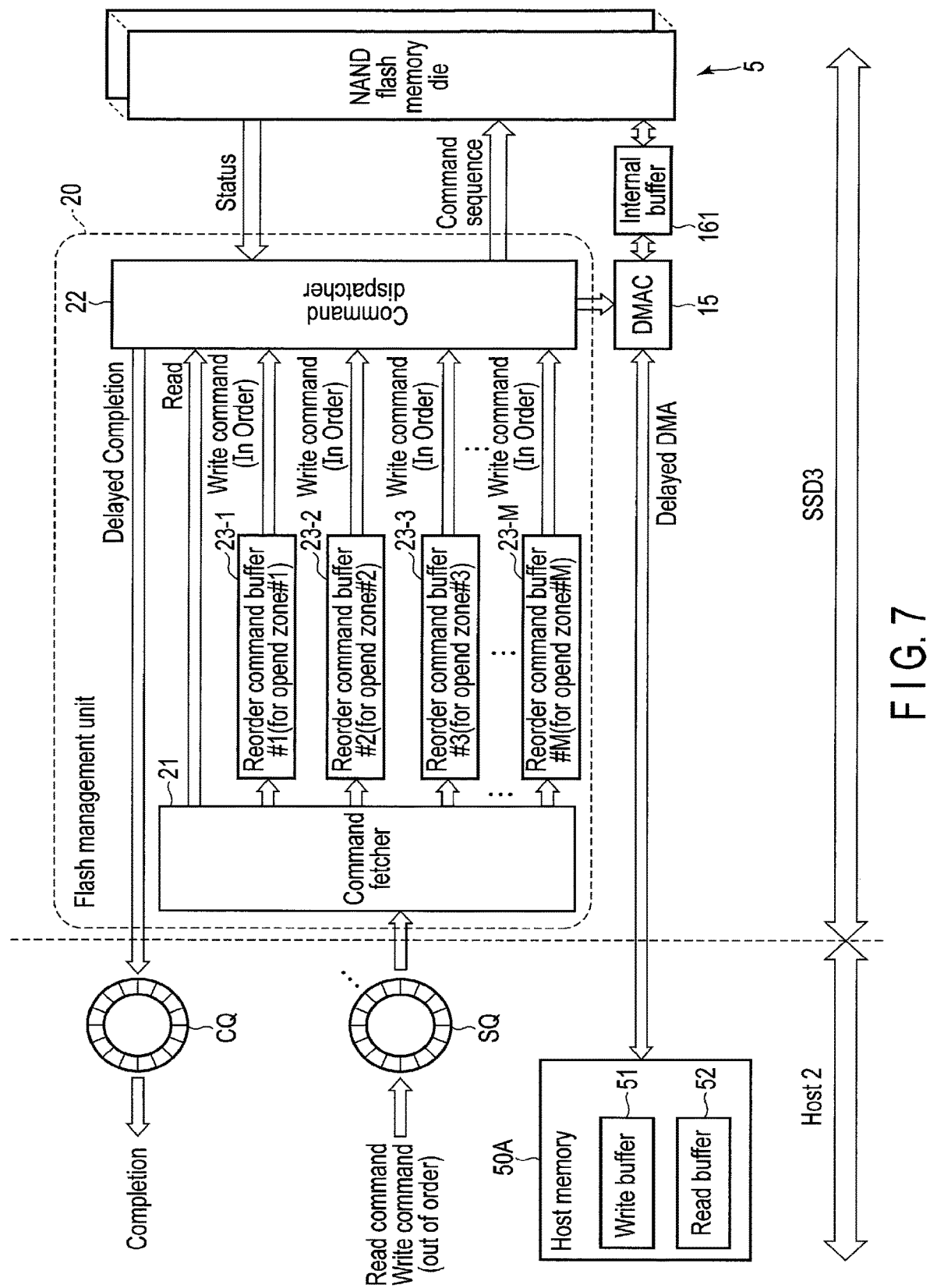
F I G. 7

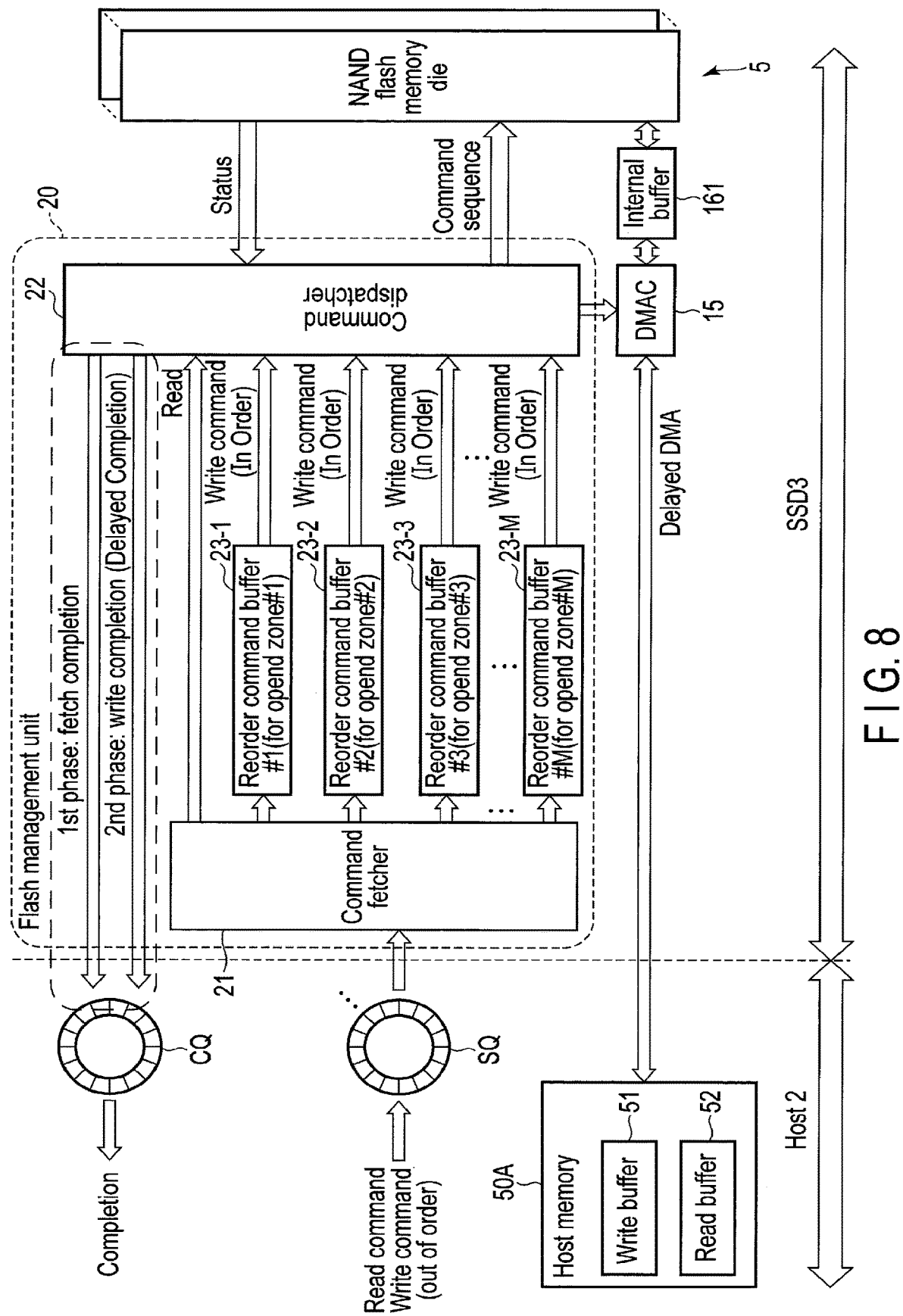
F I G. 8

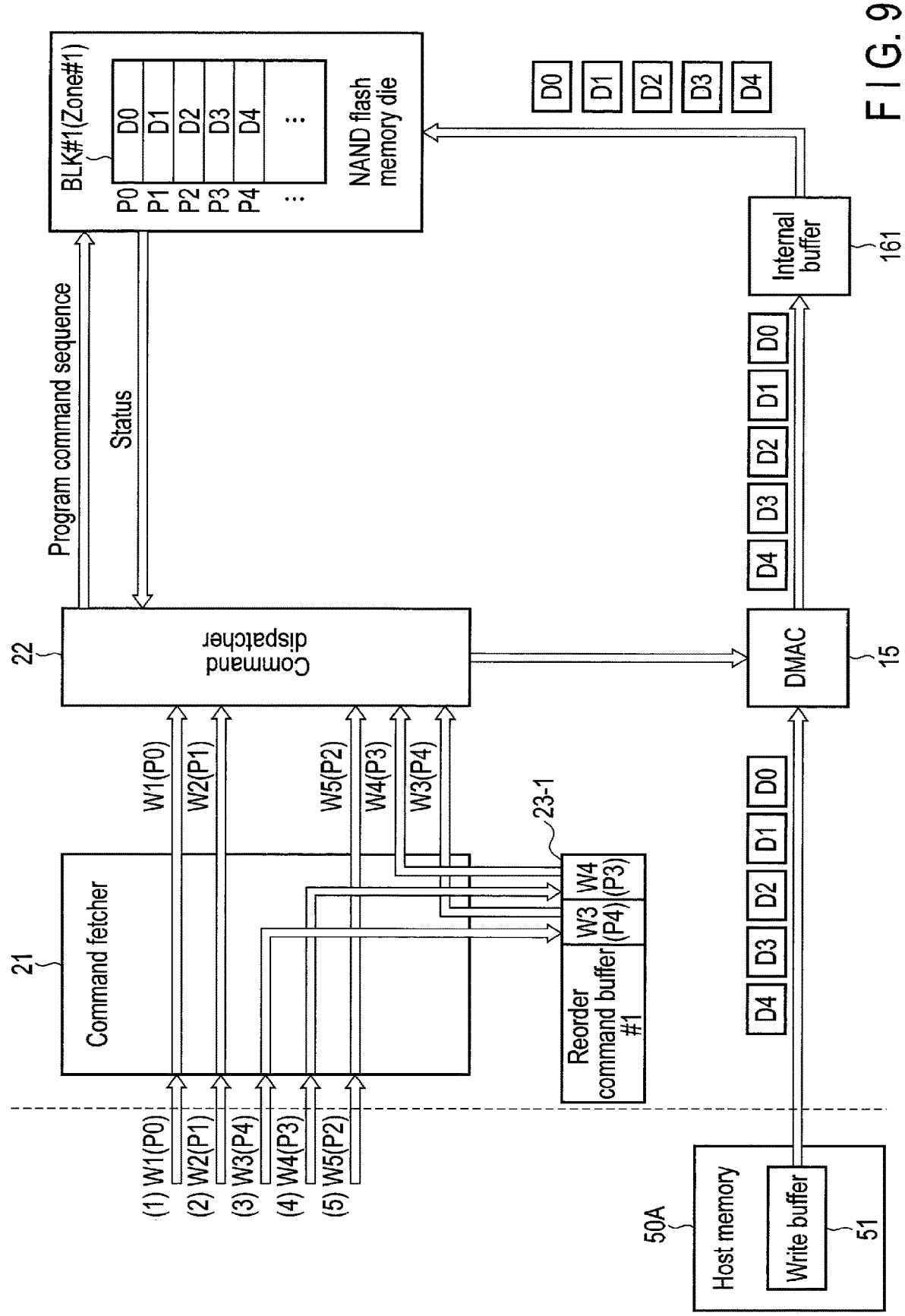
F I G. 9

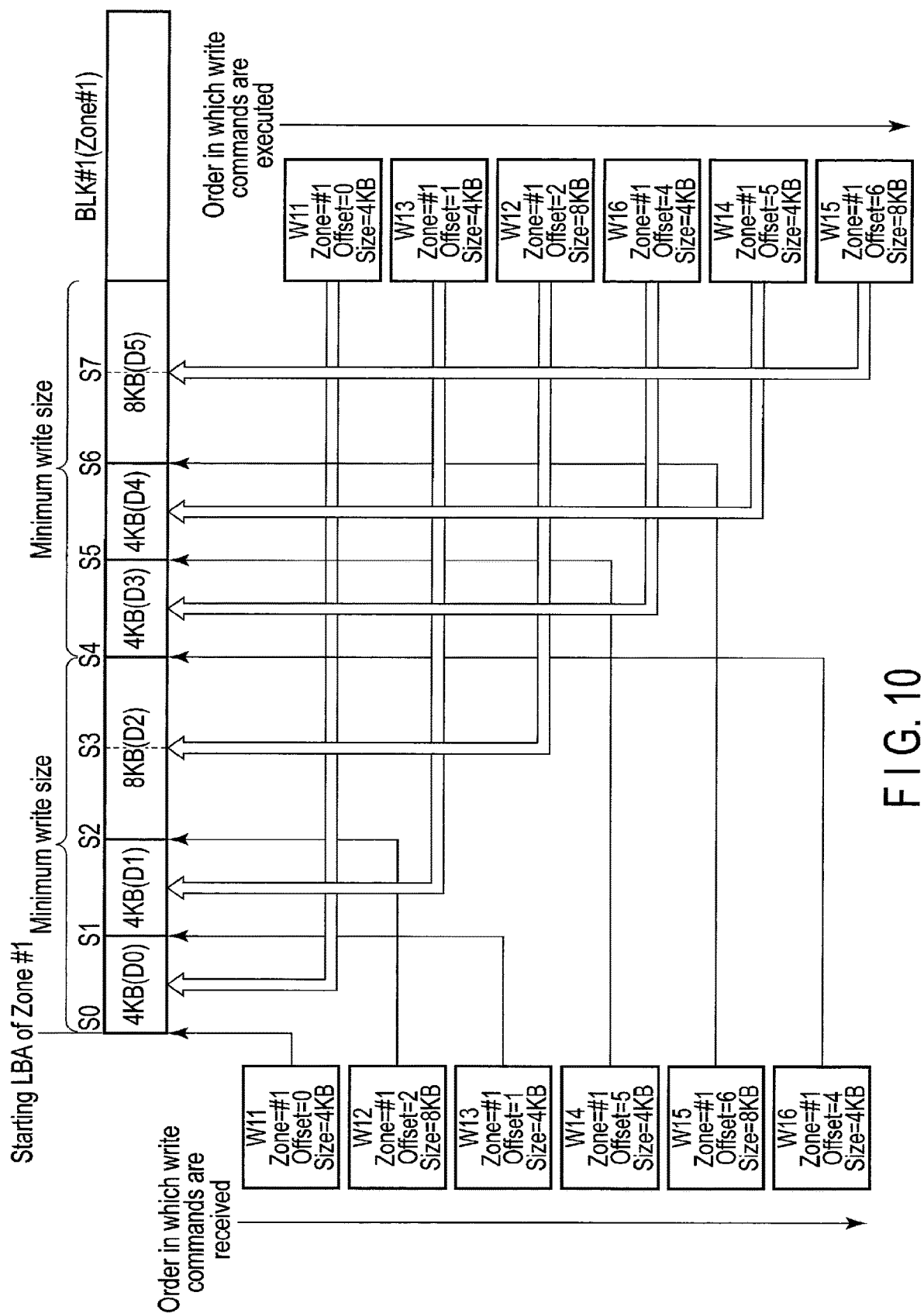
F I G. 10

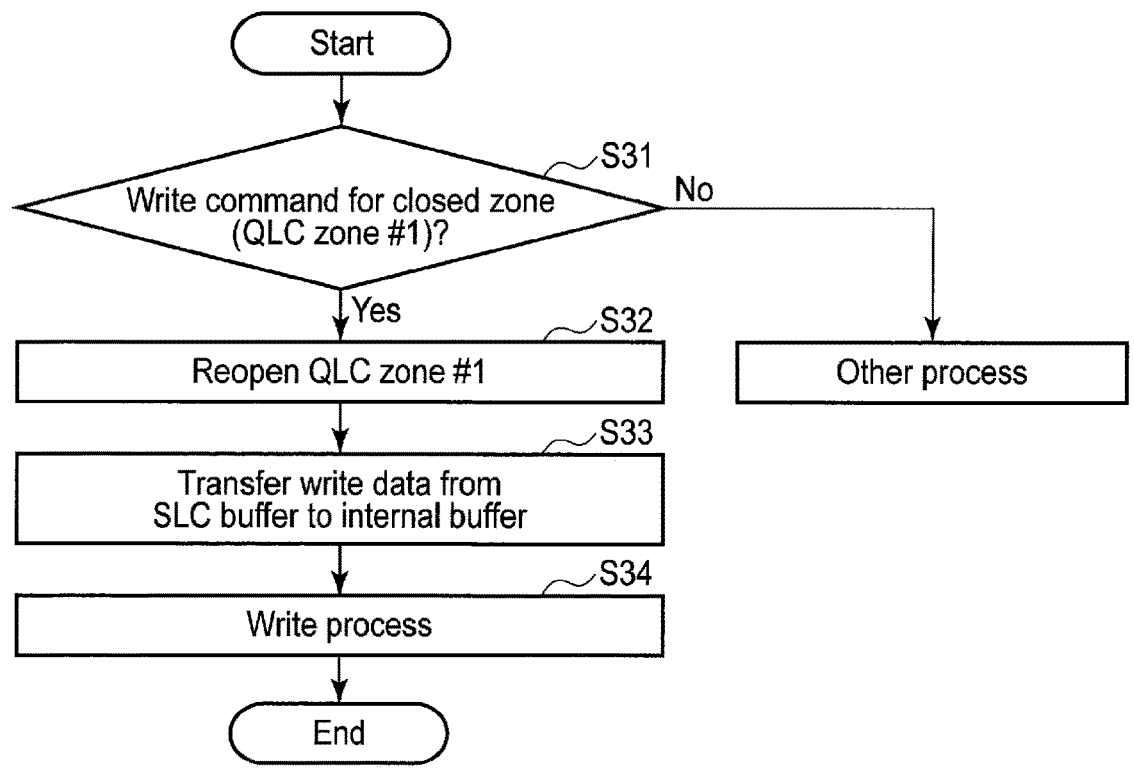
F I G. 14
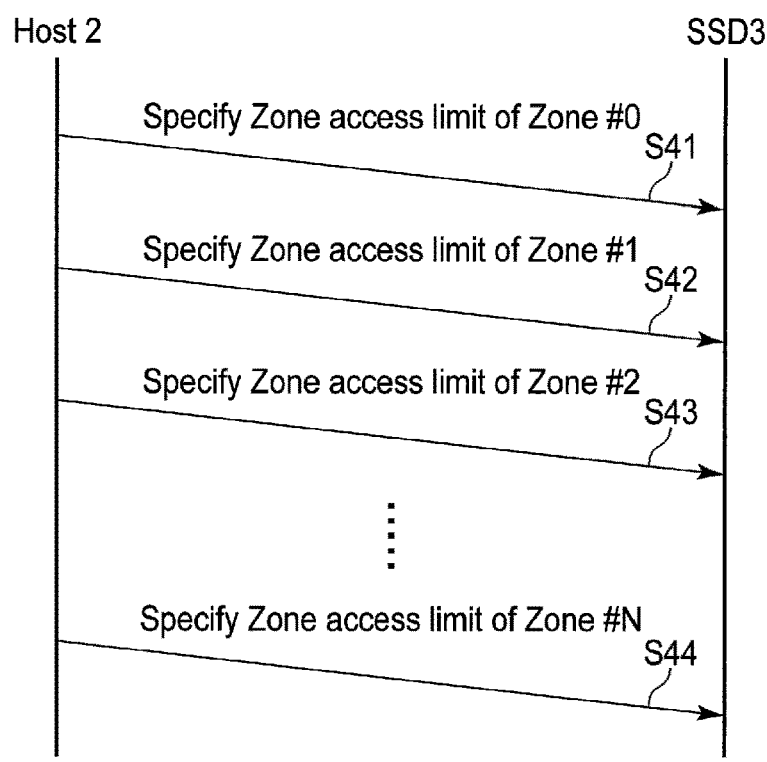
F I G. 15

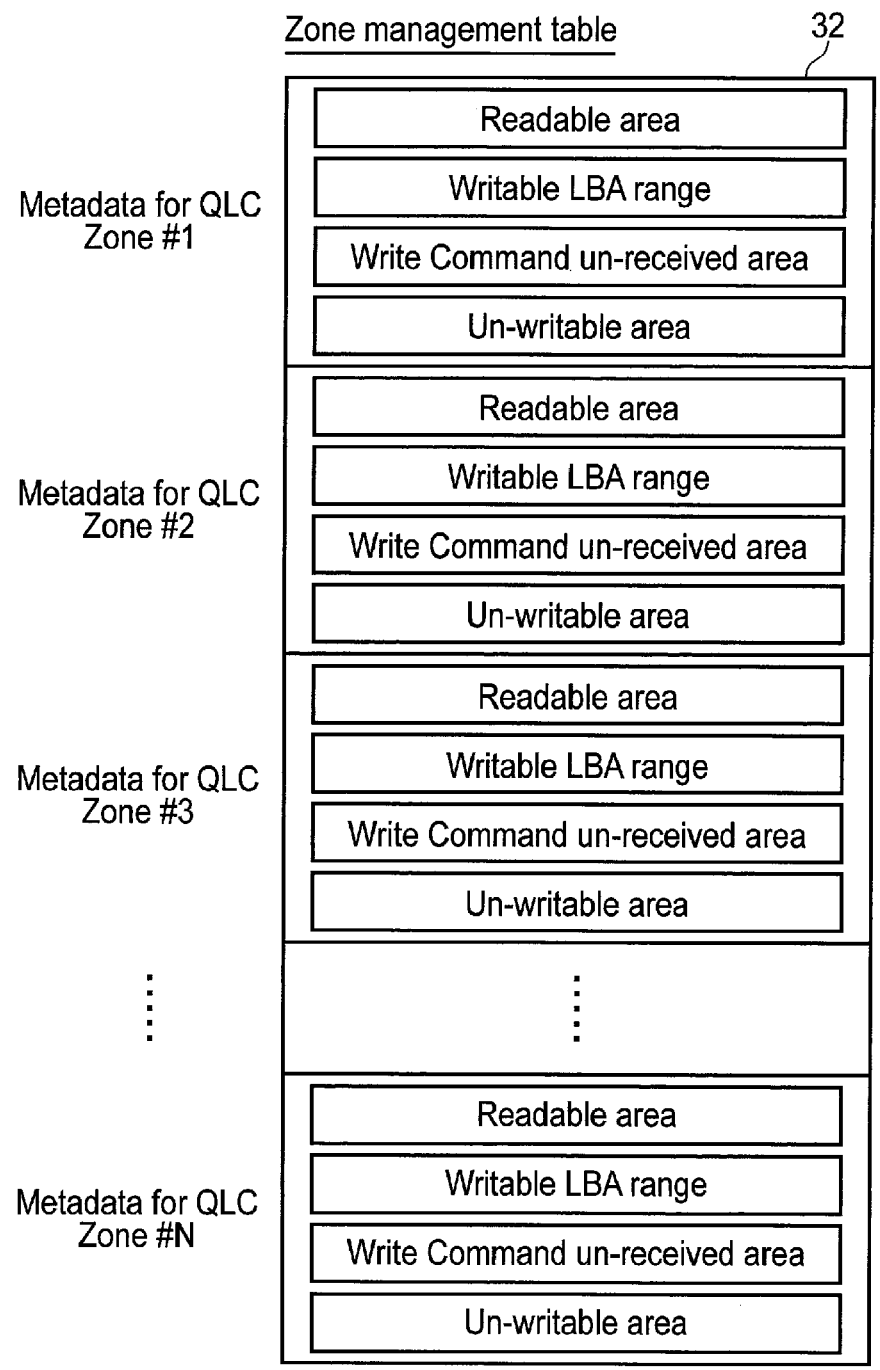
F I G. 19

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-005285, filed Jan. 16, 2020, the entire contents of which are incorporated herein by reference.

FIELD

Embodiments described herein relate generally to a technology of controlling a nonvolatile memory.

BACKGROUND

In recent years, memory systems including a nonvolatile memory are widely used.

As a type of the memory systems, a solid state drive (SSD) including a NAND flash memory is known.

The SSD is used as a storage device of various host computing systems such as servers of data centers.

For the SSD, implementing a new technique of reducing the size of a buffer required to be provided in the SSD has been considered necessary.

BRIEF DESCRIPTION OF THE DRAWINGS

FIG. 2 is a block diagram illustrating a configuration example of the memory system according to the embodiment.

FIG. 4 is a block diagram illustrating a relationship between a plurality of channels and a plurality of NAND flash memory dies, which are used in the memory system according to the embodiment.

FIG. 5 is a diagram illustrating a configuration example of a certain block group (super block) used in the memory system according to the embodiment.

FIG. 6 is a diagram illustrating a write operation of writing data to the QLC block in a write mode of writing 4 bits per memory cell.

FIG. 7 is a block diagram illustrating a configuration example of a flash management unit included in the memory system according to the embodiment.

FIG. 8 is a block diagram illustrating another configuration example of the flash management unit included in the memory system according to the embodiment.

FIG. 9 is a diagram illustrating an example of a write command reordering operation executed in the memory system according to the embodiment.

FIG. 10 is a diagram illustrating another example of the write command reordering operation executed in the memory system according to the embodiment.

FIG. 14 is a flowchart illustrating a procedure of an operation executed in the memory system according to the embodiment in response to reception of a write command for a QLC zone which is in a close state.

FIG. 15 is a sequence chart illustrating an example of a process of notifying the memory system of an access limit of each zone from a host.

FIG. 19 is a diagram illustrating an example of a data structure of a zone management table used in the memory system according to the embodiment.

DETAILED DESCRIPTION

Various embodiments will be described hereinafter with reference to the accompanying drawings.

In general, according to one embodiment, a memory system connectable to a host comprises a nonvolatile memory, and a controller electrically connected to the nonvolatile memory and configured to manage a plurality of first storage regions included in the nonvolatile memory as a plurality of zones to which a plurality of logical address ranges obtained by dividing a logical address space for accessing the memory system are assigned respectively.

The controller receives a plurality of first write commands from the host. Each of the plurality of first write commands specifies (i) a logical address indicative of both a first zone of the plurality of zones and an offset within the first zone where write data is to be written, (ii) a data size of the write data, and (iii) a location in a write buffer of the host where the write data is stored. Based on the offset and the data size specified by each of the plurality of first write commands, the controller reorders the plurality of first write commands in an order in which writing within the first zone is sequentially executed from a next write location within the first zone, by using a first command buffer corresponding to the first zone.

When the writing within the first zone becomes capable of being executed sequentially in equal to or larger than a minimum write size of each first storage region from the next write location within the first zone, by the reordering of the plurality of first write commands, the controller transfers a plurality of write data respectively associated with the plurality of first write commands reordered, from the write buffer of the host to an internal buffer of the memory system, in a same order as the order of the plurality of first write commands reordered, and writes the plurality of write data transferred to the internal buffer to a first storage region, of the plurality of first storage regions, which is managed as the first zone.

Figure 1:
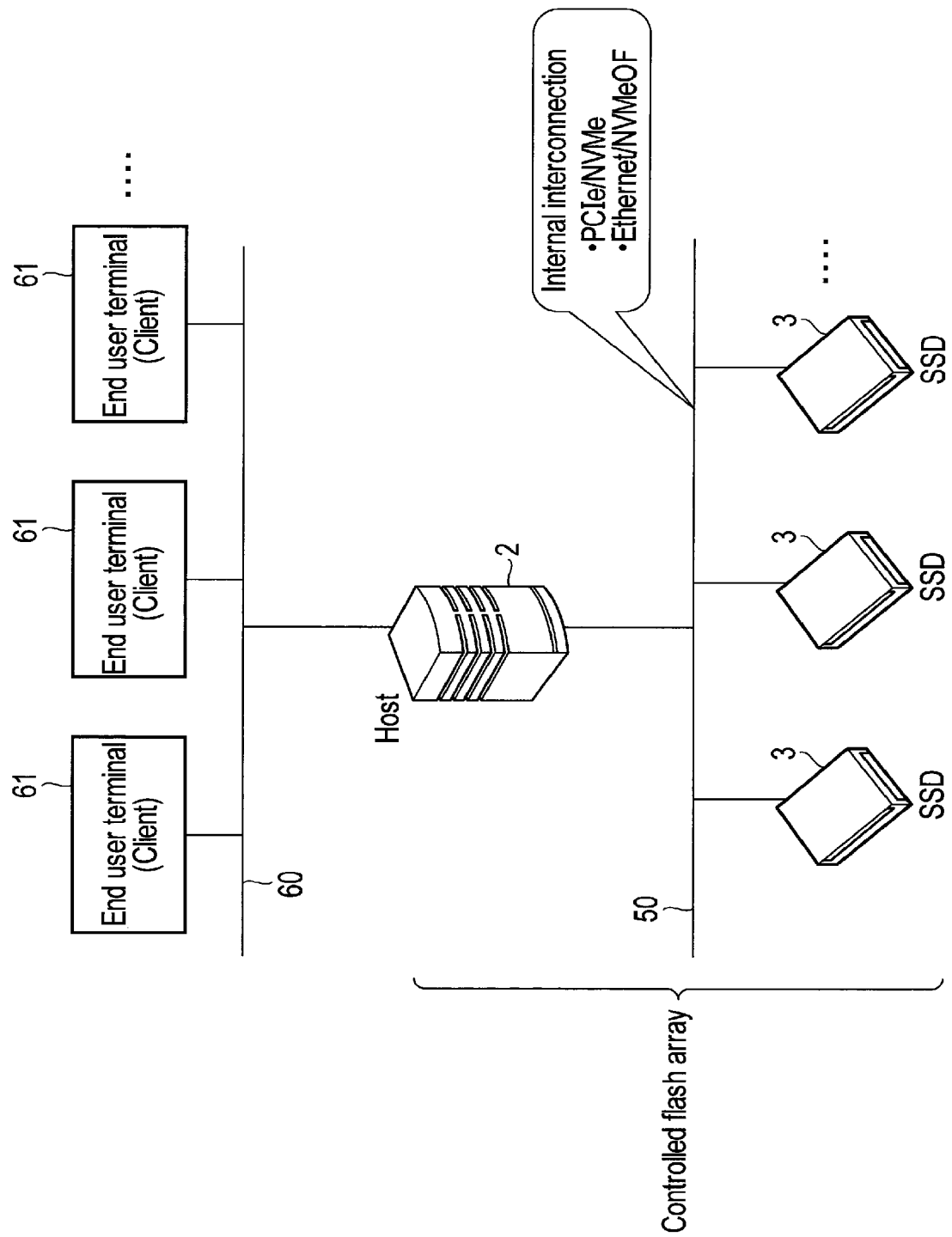
FIG. 1 is a block diagram illustrating a relationship between a host and a memory system according to an embodiment.

FIG. 1 is a block diagram illustrating a relationship between a host and a memory system according to an embodiment.

The memory system is a semiconductor storage device configured to write data to a nonvolatile memory and to read data from the nonvolatile memory. The memory system is implemented as a solid-state drive (SSD) 3 based on a NAND flash technology.

A host (host device) 2 is configured to control a plurality of SSDs 3. The host 2 is implemented by an information processing apparatus configured to use a flash array including the plurality of SSDs 3 as a storage. The information processing apparatus may be a personal computer or a server computer.

Note that the SSD 3 may be used as one of a plurality of storage devices included in a storage array. The storage array may be connected to an information processing apparatus such as a server computer via a cable or a network. The storage array includes a controller which controls the plurality of storage devices (for example, a plurality of SSDs 3) in the storage array. When the SSD 3 is applied to the storage array, the controller of the storage array may function as a host of the SSD 3.

An example of a case where an information processing apparatus such as a server computer functions as the host 2 will be described below.

The host (server) 2 and the plurality of SSDs 3 are interconnected via an interface 50 (internal interconnection). The interface 50 for interconnection is not limited to this, but PCI Express (PCIe) (registered trademark), NVM Express (NVMe) (registered trademark), Ethernet (registered trademark), NVMe over Fabrics (NVMeOF) or the like may be used as the interface 50 for interconnection.

A typical example of the server computer which functions as the host 2 is a server computer (hereinafter referred to as a server) in a data center.

In a case where the host 2 is implemented by the server in the data center, the host (server) 2 may be connected to a plurality of end user terminals (clients) 61 via a network 60. The host 2 can provide various services to the end user terminals 61.

Examples of services which can be provided by the host (server) 2 are (1) Platform as a Service (PaaS) which provides a system running platform for each client (each end user terminal 61), (2) Infrastructure as a Service (IaaS) which provides an infrastructure such as a virtual server for each client (each end user terminal 61), and the like.

A plurality of virtual machines may be executed on a physical server which functions as the host (server) 2. Each of the virtual machines running on the host (server) 2 can function as a virtual server configured to provide various services for the client (end user terminal 61) corresponding to the virtual machine. In each virtual machine, an operating system and a user application which are used by the corresponding end user terminal 61 are executed. The operating system corresponding to each virtual machine includes an I/O service. The I/O service may be a block I/O service based on a logical block address (LBA) or a key-value store service.

In the operating system corresponding to each virtual machine, the I/O service issues I/O commands (a write command and a read command) in response to a request of write/read from the user application. The I/O commands are transmitted to the SSD 3 via one or more submission queues in the host 2.

The controller of the SSD 3 is configured to selectively use a first write mode of writing a plurality of bits per memory cell and a second write mode of writing 1 bit per memory cell and to write the write data from the host 2 to the nonvolatile memory.

In this case, the controller of the SSD 3 may write the data to each of a plurality of first storage regions included in the nonvolatile memory in the first write mode of writing a plurality of bits per memory cell, and may write the data to a second storage region included in the nonvolatile memory in the second write mode of writing 1 bit per memory cell.

FIG. 2 illustrates a configuration example of the SSD 3.

The SSD 3 includes a controller 4 and a NAND flash memory 5. The SSD 3 also may include a random access memory, for example, DRAM 6.

The NAND flash memory 5 is an example of a nonvolatile memory and includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 includes a plurality of pages (pages P0 to Pn−1 in this case). Each of the blocks BLK0 to BLKm−1 is a unit for a data erase operation of erasing data. The blocks may also be referred to as erase blocks, physical blocks or physical erase blocks. Each of the pages P0 to Pn−1 includes a plurality of memory cells connected to one word line. Each of the pages P0 to Pn−1 is a unit for a data write operation of writing data and a data read operation of reading data.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be realized by a circuit such as a System-on-a-chip (SoC).

The controller 4 supports Zoned Namespaces (ZNS) conforming to NVMe and can cause the SSD 3 to operate as a zoned device.

The zoned device is a device which is accessed by using a plurality of logical address ranges obtained by dividing logical address spaces for accessing the SSD 3. The logical address spaces for accessing the SSD 3 are contiguous logical addresses used by the host 2 to access the SSD 3.

The controller 4 is configured to manage a plurality of storage regions in the NAND flash memory 5 as a plurality of zones, respectively. The plurality of first storage regions mentioned above may be managed as a plurality of zones.

One first storage region corresponding to a certain zone is accessed by using contiguous logical addresses included in the logical address range assigned to this zone. Logical block addresses (LBAs) are normally used as the logical addresses.

Figure 3:
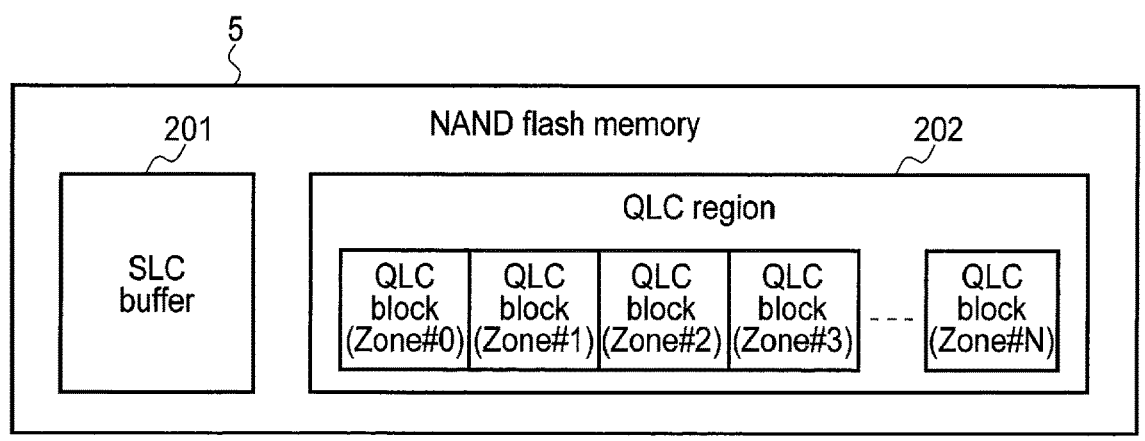
FIG. 3 is a block diagram illustrating a plurality of quad-level cell blocks (QLC blocks) and a single-level cell buffer (SLC buffer), which are used in the memory system according to the embodiment.

The NAND flash memory 5 includes a single-level cell buffer (SLC buffer) 201 and a quad-level cell region (QLC region) 202 as illustrated in FIG. 3. The quad-level cell region (QLC region) 202 includes a plurality of quad-level cell blocks (QLC blocks).

The QLC block is a block where the data are written in a write mode (also referred to as a program mode) to store 4 bits per memory cell. The plurality of QLC blocks in the QLC region 202 may be used as the plurality of first storage regions mentioned above. In this case, the plurality of QLC blocks are managed as the plurality of zones mentioned above.

In FIG. 3, a case where N+1 QLC blocks are used as N+1 zones is exemplary illustrated. In this case, the LBA space of the SSD 3 is divided into N+1 LBA ranges. These N+1 LBA ranges are used for the host 2 to selectively access the N+1 zones. The SSD 3 may notify the host 2 of a starting LBA of each zone in the LBA space such that the host 2 can specify an access target zone.

Basically, the host 2 is required to sequentially execute write in one zone. For this reason, as regards each of the N+1 zones, the host 2 manages a write pointer (WP) indicative of a next write location within the zone. At the start of write in a certain zone, the write pointer (WP) is indicative of the starting LBA of this zone as a next write location. The value of the write pointer (WP) advances as write commands to write the data to this zone are issued.

In the operation of writing the data to each of the QLC blocks, 4-page data are written to a plurality of memory cells connected to the same word line. The data of 4 bits per memory cell can be thereby written.

The SLC buffer 201 may include a plurality of SLC blocks. Each of the SLC blocks is a block where the data are written in a write mode (also referred to as a program mode) to store 1 bit per memory cell. The SLC buffer 201 is an example of the above-mentioned second storage region.

The storage density per memory cell in the SLC block is 1 bit (i.e., 1 page per word line) and the storage density per memory cell in the QLC block is 4 bits (i.e., 4 pages per word line).

The read speed and write speed of the data from and to the NAND flash memory 5 are slower as the storage density is higher and are higher as the storage density is lower. Therefore, the time required to read and write the data from and to the QLC block is longer than the time required to read and write the data from and to the SLC block.

The write operation in each block of the NAND flash memory 5 needs to be sequentially executed from the lead to the end tail of the block.

In the QLC block, too, the write operation needs to be sequentially executed from the lead to the end tail of the QLC block. The operation of writing the data to the QLC block is executed by, for example, foggy-fine write operation.

The foggy-fine write operation includes multiple-time write operations (foggy write operation and fine write operation) to memory cells connected to the same word line in the QLC block. The first write operation (foggy write operation) is a write operation to roughly set a threshold voltage of each memory cell, and the second write operation (fine write operation) is a write operation to adjust the threshold voltage of each memory cell.

In the first write operation (foggy write operation), 4-page data are first transferred in page size units to the NAND flash memory 5 by a first data transfer operation. That is, when the data size (page size) per page is 16 KB, 64 KB-size data are transferred in page size units to the NAND flash memory 5. Then, the first write operation (foggy write operation) to program the 4-page data to the memory cell array in the NAND flash memory 5 is executed.

In the second write operation (fine write operation), similarly to the foggy program operation, the 4-page data are transferred again in page size units to the NAND flash memory 5 by the second data transfer operation. The data transferred to the NAND flash memory 5 in the second data transfer operation are the same as the data transferred to the NAND flash memory 5 by the first data transfer operation. Then, the second write operation (fine write operation) to program the transferred 4-page data to the memory cell array in the NAND flash memory 5 is executed.

Furthermore, even if the foggy write operation to a plurality of memory cells connected to a certain word line is finished, the fine write operation to the plurality of memory cells connected to this word line cannot be executed immediately. The fine write operation to the plurality of memory cells connected to this word line can be executed after the foggy write operation to memory cell groups connected to one or more subsequent word lines is finished.

Thus, the foggy-fine write operation of the QLC block is sequentially executed from the lead to the end tail of the QLC block, across several word lines. An influence from program disturb can be thereby minimized.

In addition, the data written to a plurality of memory cells connected to a certain word line of the QLC block by the foggy write operation can be read after the fine write operation of the plurality of memory cells connected to this word line is finished.

As illustrated in FIG. 4, the NAND flash memory 5 may include a plurality of NAND flash memory dies. Each of the NAND flash memory dies can operate independently. For this reason, the NAND flash memory dies function as units capable of parallel operations.

FIG. 4 illustrates an example of a case where sixteen channels Ch. 1 to Ch. 16 are connected to the NAND interface 13, and two NAND flash memory dies are connected to each of sixteen channels Ch. 1 to Ch. 16.

In this case, sixteen NAND flash memory dies #1 to #16 connected to the channels Ch. 1 to Ch. 16 may be organized as bank #0 and the remaining sixteen NAND flash memory dies #17 to #32 connected to the channels Ch. 1 to Ch. 16 may be organized as bank #1. The bank functions as a unit that causes a plurality of memory dies to execute the parallel operation by bank interleaving. In the configuration example illustrated in FIG. 4, a maximum of thirty-two NAND flash memory dies can execute the parallel operation by sixteen channels and the bank interleaving using two banks.

An erase operation may be executed in units of single block (physical block) or units of block group (super block) including a set of a plurality of physical blocks capable of executing the parallel operation. One block group, i.e., one super block including a set of a plurality of physical blocks is not limited to these, but may include a total of thirty-two physical blocks each selected from the NAND flash memory dies #1 to #32. Incidentally, each of the NAND flash memory dies #1 to #32 may have a multi-plane configuration. For example, if each of the NAND flash memory dies #1 to #32 comprises the multi-plane configuration including two planes, one super block may include a total of sixty-four physical blocks each selected from sixty-four planes corresponding to the NAND flash memory dies #1 to #32.

FIG. 5 illustrates an example of a QLC super block (QLC SB) including thirty-two physical blocks (physical block BLK2 in the NAND flash memory die #1, physical block BLK3 in the NAND flash memory die #2, physical block BLK7 in the NAND flash memory die #3, physical block BLK4 in the NAND flash memory die #4, physical block BLK6 in the NAND flash memory die #5, ... physical block BLK3 in the NAND flash memory die #32).

Each of the QLC blocks illustrated in FIG. 3 may be implemented by one super block (QLC super block) or one physical block (QLC physical block). The QLC physical block is a physical block where the data are written in the write mode of writing 4 bits per memory cell.

Incidentally, each super block may include only one physical block. In this case, the super block is equivalent to one physical block.

In the embodiment, a plurality of physical blocks included in the NAND flash memory 5 are classified into a set of first physical blocks and a set of second physical blocks. The set of the first physical block is organized as a plurality of first storage regions (a plurality of QLC blocks) and the set of the second physical blocks is organized as a second storage region (SLC buffer 201).

The plurality of first storage regions (a plurality of QLC blocks) are used as user data storage regions where the data (user data) written by the host 2 are to be stored. The plurality of first storage regions are used as the plurality of zones as described above.

Next, the configuration of the controller 4 illustrated in FIG. 2 will be described.

The controller 4 may function as a flash translation layer (FTL) configured to execute data management and block management of the NAND flash memory 5. The data management executed by the FTL includes (1) management of mapping information indicative of correspondences between logical addresses and physical addresses of the NAND flash memory 5, (2) a process for concealing restrictions of the NAND flash memory 5 (for example, read/write operations in units of pages and an erase operation in units of blocks), and the like. The logical address is an address used by the host 2 to access the SSD 3. As the logical address, the above-mentioned LBA can be used.

The management of mapping between each of the logical addresses used by the host 2 to access the SSD 3 and each of the physical addresses of the NAND flash memory 5 is executed by using an address translation table (i.e., a logical-to-physical address translation table: L2P table) 31. In the embodiment, since a specific LBA range is mapped fixedly to each of the first storage regions, the L2P table 31 may be used mainly for management of mapping between each of the logical addresses and each of the physical addresses of the SLC buffer 201.

The controller 4 may manage mapping between each of the logical addresses and each of the physical addresses in units of predetermined management sizes, by using the L2P table 31. A physical address corresponding to a certain logical address is indicative of the latest physical storage location to which the data of the logical address is written, in the NAND flash memory 5 (for example, the SLC buffer 201). The L2P table 31 may be loaded from the NAND flash memory 5 into the DRAM 6 when the SSD 3 is powered on.

The controller 4 includes a host interface 11, a CPU 12, a NAND interface 13, a DRAM interface 14, a direct memory access controller (DMAC) 15, a static RAM (SRAM) 16, an ECC encoding/decoding unit 17, and the like. The host interface 11, the CPU 12, the NAND interface 13, the DRAM interface 14, the DMAC 15, the SRAM 16, and the ECC encoding/decoding unit 17 are interconnected via the bus 10.

The host interface 11 is a host interface circuit configured to execute communication with the host 2. The host interface 11 may be, for example, a PCIe controller (NVMe controller). Alternatively, when the SSD 3 is configured to be connected to the host 2 via Ethernet (registered trademark), the host interface 11 may be an NVMe over Fabrics (NVMeOF) controller.

The host interface 11 receives various commands from the host 2. These commands include a write command, a read command, an open zone command, a close zone command, a reset zone command, a finish zone command, etc.

The write command is a command (write request) of writing data to be written (write data) to the NAND flash memory 5. The write command includes, for example, a logical address (starting LBA) indicative of the first sector (also referred to as the first "logical block") where write data is to be written, the data size of the write data, a data pointer (buffer address) indicative of a location in the memory (write buffer) of the host 2 where the write data is stored, and the like. The memory of the host 2 is also simply referred to as a host memory in the following descriptions.

An upper bit portion of the logical address (starting LBA) included in the write command is used as an identifier specifying a zone where write data associated with this write command is to be written. In addition, a lower-order bit part of the logical address (starting LBA) included in the write command specifies an offset within the zone where write data is to be written.

Therefore, the logical address specified by the write command is indicative of one of a plurality of zones and an offset within this zone where write data is to be written. The offset indicates the first sector within this zone where the write data is to be written.

The data size of the write data may be specified by, for example, the number of sectors (logical blocks). One sector corresponds to the minimum data size of the write data which can be specified by the host 2. That is, the data size of the write data is indicated by the multiple of sectors.

The read command is a command (read request) to read data from the NAND flash memory 5. The read command includes, for example, a logical address (starting LBA) indicative of the first sector where data (read target data) is to be read, the data size of the read target data, a data pointer (buffer address) indicative of a location in the host memory (read buffer) to which the read target data is to be transferred, and the like.

The upper bit portion of the logical address included in the read command is used as an identifier specifying a zone where the read target data is stored. In addition, the lower bit portion of the logical address included in the read command specifies an offset within the zone where the read target data is stored. Therefore, the logical address specified by the read command is indicative of the zone, and the offset within the zone where the read target data is stored. The offset indicates the first sector to be read within this zone.

The open zone command is a command (request) to transition one of a plurality of zones each of which is in an empty state to an open state which can be used for data write. The open zone command includes a logical address specifying the zone which is to be transitioned to the open state. For example, the upper bit portion of the logical address specified by the open zone command is used as an identifier specifying the zone which is to be transitioned to the open state.

The close zone command is a command (request) to transition one of zones in the open state to the closed state in which the write is suspended. The close zone command includes a logical address specifying the zone which is to be transitioned to the close state. For example, the upper bit portion of the logical address specified by the close zone command is used as an identifier specifying the zone which is to be transitioned to the close state.

The reset zone command is a command (request) to reset the zone where rewrite is to be executed and transition the zone to the empty state. For example, the reset zone command is used to transition a full state zone filled with data to the empty state where the zone does not include valid data. The valid data is indicative of data associated with a certain logical address. The reset zone command includes a logical address specifying the zone which is to be transitioned to the empty state. For example, the upper bit portion of the logical address specified by the reset zone command is used as an identifier specifying the zone which is to be transitioned to the empty state. The write pointer value corresponding to the zone transitioned to the empty state is set to a value indicative of the starting LBA of this zone.

The finish zone command is a command (request) to transition the state of the zone to the full state before the zone is actually filled with data and thereby finish the write to this zone. The finish zone command includes a logical address specifying the zone which is to be transitioned to the full state. For example, the upper bit portion of the logical address specified by the finish zone command is used as an identifier specifying the zone which is to be transitioned to the full state.

The CPU 12 is a processor configured to control the host interface 11, the NAND interface 13, the DRAM interface 14, the DMAC 15, the SRAM 16, and the ECC encode/decode unit 17. The CPU 12 loads a control program (firmware) from the NAND flash memory 5 or a ROM (not illustrated) into the DRAM 6 in response to power-on of the SSD 3 and executes the firmware to execute various processes. The firmware may be loaded on the SRAM 16. The CPU 12 can execute command processes for processing various commands from the host 2, and the like. The operations of the CPU 12 are controlled by the above-mentioned firmware. A part or all parts of the command process may be executed by dedicated hardware in the controller 4.

The CPU 12 can function as the flash management unit 20. A part or all parts of the flash management unit 20 may also be implemented by dedicated hardware in the controller 4.

The flash management unit 20 receives the write commands from the host 2 and classifies the received write commands into a plurality of groups corresponding to the plurality of zones. As described above, each of the write commands specifies (i) the logical address (for example, LBA) indicative of both one of the plurality of zones and the offset within this zone where the write data is to be written, (ii) the data size of the write data, and (iii) the location in the write buffer inside the host 2 where the write data is stored.

The flash management unit 20 comprises a write command reordering function of reordering the write commands such that the writing within each zone is executed sequentially.

For example, a case of reordering a plurality of write commands to write data to a certain zone (first zone) among the plurality of zones is assumed.

Each of the write commands (first write commands) to write the data to the first zone specifies the first zone, the offset within the first zone where the write data is to be written, the data size of the write data, and the location in a write buffer of the host 2 where the write data is stored.

The first zone is specified by an upper bit portion of the LBA included in each first write command. The offset is specified by a lower bit portion of the LBA included in each first write command.

Based on the offset and the data size specified by each of the plurality of first write commands received, the flash management unit 20 reorders the plurality of first write commands received in an order in which the writing within the first zone is sequentially executed from a next write location within the first zone, by using a first command buffer corresponding to the first zone.

For example, when write command #1 to specify the offset corresponding to a lead storage location of the first zone, write command #2 to specify the offset corresponding to a third storage location of the first zone, write command #3 to specify the offset corresponding to a fourth storage location of the first zone, and write command #4 to specify the offset corresponding to a second storage location of the first zone are received in this order, these write commands are reordered in an order of the write command #1, the write command #4, the write command #2, and the write command #3.

When the writing within the first zone can be executed sequentially in equal to or larger than the minimum write size of the first storage region from a next write location, by the reordering of the plurality of first write commands, the flash management unit 20 transfers the plurality of write data respectively associated with the plurality of first write commands reordered, from the write buffer of the host 2 to an internal buffer 161, in the same order as the order of the plurality of first write commands reordered. In this case, a part of the storage region of the SRAM 16 may be used as the internal buffer 161 or a part of the storage region of the DRAM 6 may be used as the internal buffer 161.

Then, the flash management unit 20 writes the plurality of write data transferred to the internal buffer 161 to one of the plurality of first storage regions, which is managed as the first zone.

If a configuration that every time the first write command is received from the host 2 the write data associated with the received write command is transferred from the host 2 to the buffer in the SSD 3 is used, a large-capacity buffer needs to be prepared in the SSD 3.

This is because if the order of receiving the first write commands from the host 2 is different from the order of writing within the first zone the buffer in the SSD 3 may be occupied for a long time by the write data which cannot start being written to the first zone. In addition, a buffer space for reordering several write data that cannot start being written to the first zone is required.

In the embodiment, the plurality of write data received are not reordered, but the plurality of first write commands received are reordered in the order in which the writing within the first zone is executed sequentially from a next write location within the first zone. Then, when the writing within the first zone can be executed sequentially in equal to or larger than the minimum write size from a next write location within the first zone, by the reordering of the plurality of first write commands, the plurality of write data associated with the plurality of first write commands reordered are transferred from the write buffer of the host 2 to the internal buffer 161, in the SSD 3 in the same order as the order of the plurality of first write commands reordered, i.e., the same order as the order of writing the plurality of write data within the first zone.

For example, as described above, when write command #1 to specify the offset corresponding to a lead storage location of the first zone, write command #2 to specify the offset corresponding to a third storage location of the first zone, write command #3 to specify the offset corresponding to a fourth storage location of the first zone, and write command #4 to specify the offset corresponding to a second storage location of the first zone are received in this order, the write commands #1 to #4 are reordered in the order of the write command #1, the write command #4, the write command #2, and the write command #3. The writing within the first zone can be executed sequentially in equal to or larger than the smallest write size from the next write location, by reordering the write commands #1 to #4. Then, the write data #1 to #4 associated with the write commands #1 to #4 are transferred from the write buffer of the host 2 to the internal buffer 161 in the same order as the order of the reordered write commands #1 to #4 (write command #1, write command #4, write command #2, and write command #3), i.e., the order of the write data #1, write data #4, write data #2, and write data #3.

The order of the write data #1, write data #4, write data #2, and write data #3 matches the order in which the writing within the first zone can be executed sequentially from the next write location within the first zone. Therefore, the flash management unit 20 can rapidly start the writing of each write data transferred to the internal buffer 161 without reordering these write data.

Consequently, it is possible to prevent the internal buffer 161 from being occupied for a long time by several write data that are to be written to locations different from the next write location within the first zone, and the size of the internal buffer 161 which needs to be provided in the SSD 3 can be reduced. In addition, the dedicated buffer for reordering the write data does not need to be provided in the SSD 3. In the embodiment, the command buffer for reordering the write commands is required but, in general, the size of each write command is remarkably smaller than the size of the write data, and the total size of the buffer which needs to be provided in the SSD 3 can be therefore reduced.

Furthermore, the writing within each zone can be executed even if the host 2 does not strictly manage the order of issuing the write commands to the same zone. The load on the host 2 which is required to sequentially execute the writing within the zone can be therefore reduced.

Moreover, without awaiting the host 2 receiving from the SSD 3 a response indicative of completion of a previous write command for a certain zone, the host 2 can place the other write command for this zone into the submission queue SQ. Therefore, write throughout can be improved.

The flash management unit 20 includes a command fetcher 21 and a command dispatcher 22. The command fetcher 21 fetches commands from one or more submission queues of the host 2, respectively. In the controller 4, the same number of command buffers as the number of the plurality of zones which are in the open state are managed.

The command fetcher 21 classifies the fetched write commands into a plurality of groups corresponding to the plurality of zones in the open state. Then, the command fetcher 21 reorders a set of write commands belonging to each group by using the command buffer corresponding to each group.

The command dispatcher 22 executes each of the reordered write commands in each command buffer. That is, the command dispatcher 22 executes the write commands for writing data to a same zone in the order of the reordered write commands.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the storage region of the DRAM 6 may be used as the storage region for the L2P table 31 and the storage region for the zone management table 32. The zone management table 32 includes management information corresponding to each of the plurality of QLC blocks. The internal buffer 161 may not be arranged in the SRAM 16, but may be arranged in the DRAM 6.

The DMAC 15 executes data transfer between the write buffer of the host 2 and the internal buffer 161 under control of the CPU 12. When the data is to be transferred from the write buffer of the host 2 to the internal buffer 161, the CPU 12 specifies for the DMAC 15 a transfer source address indicative of a location in the write buffer of the host 2, the size of the data to be transferred, and a transfer destination address indicative of a location in the internal buffer 161. In addition, when the data is to be transferred from the internal buffer 161 to a read buffer of the host 2, the CPU 12 specifies for the DMAC 15 a transfer source address indicative of a location in the internal buffer 161, the size of the data to be transferred, and a transfer destination address indicative of a location in the read buffer of the host 2.

When the data is to be written to the NAND flash memory 5, the ECC encode/decode unit 17 encodes the data (data to be written) (ECC encoding), thereby adding an error correction code (ECC) to the data as a redundant code. When the data is read from the NAND flash memory 5, the ECC encode/decode unit 17 executes error correction of the read data using the ECC added to the read data (ECC decoding).

FIG. 6 is a diagram illustrating a write operation of writing data to the first storage region (QLC block) in a write mode of writing 4 bits per memory cell.

An example of the foggy-fine write operation executed across four word lines will be described. The foggy-fine write operation to the QLC block #1 is executed in the following manner.

(1) First, write data of four pages (P0 to P3) is transferred to the NAND flash memory 5 in a page unit, and the foggy write operation for writing the write data of the four pages (P0 to P3) to a plurality of memory cells connected to a word line WL0 in the QLC block #1 is executed.

(2) Next, write data of next four pages (P4 to P7) is transferred to the NAND flash memory 5 in a page unit, and the foggy write operation for writing the write data of the four pages (P4 to P7) to a plurality of memory cells connected to a word line WL1 in the QLC block #1 is executed.

(3) Next, write data of next four pages (P8 to P11) is transferred to the NAND flash memory 5 in a page unit, and the foggy write operation for writing the write data of the four pages (P8 to P11) to a plurality of memory cells connected to a word line WL2 in the QLC block #1 is executed.

(4) Next, write data of next four pages (P12 to P15) is transferred to the NAND flash memory 5 in a page unit, and the foggy write operation for writing the write data of the four pages (P12 to P15) to a plurality of memory cells connected to a word line WL3 in the QLC block #1 is executed.

(5) When the foggy write operation to the plurality of memory cells connected to the word line WL3 is finished, a write target word line returns to the word line WL0 such that the fine write operation to the plurality of memory cells connected to the word line WL0 can be executed. Then, the same write data of four pages (P0 to P3) as the write data of the four pages (P0 to P3) used in the foggy write operation to the word line WL0 is transferred again to the NAND flash memory 5 in a page unit and the fine write operation for writing the write data of the four pages (P0 to P3) to the plurality of memory cells connected to the word line WL0 in the QLC block #1 is executed. The foggy-fine write operation for pages P0 to P3 is thereby finished. As a result, the data corresponding to the pages P0 to P3 can be read correctly from the QLC block #1.

(6) Next, write data of next four pages (P16 to P19) is transferred to the NAND flash memory 5 in a page unit, and the foggy write operation for writing the write data of the four pages (P16 to P19) to a plurality of memory cells connected to a word line WL4 in the QLC block #1 is executed.

(7) When the foggy write operation to the plurality of memory cells connected to the word line WL4 is finished, a write target word line returns to the word line WL1 such that the fine write operation to the plurality of memory cells connected to the word line WL1 can be executed. Then, the same write data of four pages (P4 to P7) as the write data of the four pages (P4 to P7) used in the foggy write operation to the word line WL1 is transferred again to the NAND flash memory 5 in a page unit, and the fine write operation for writing the write data of the four pages (P4 to P7) to the plurality of memory cells connected to the word line WL1 in the QLC block #1 is executed. The foggy-fine write operation for pages P4 to P7 is thereby finished. As a result, the data corresponding to the pages P4 to P7 can be read correctly from the QLC block #1.

(8) Next, write data of next four pages (P20 to P23) is transferred to the NAND flash memory 5 in a page unit, and the foggy write operation for writing the write data of the four pages (P20 to P23) to a plurality of memory cells connected to a word line WL5 in the QLC block #1 is executed.

(9) When the foggy write operation to the plurality of memory cells connected to the word line WL5 is finished, a write target word line returns to the word line WL2 such that the fine write operation to the plurality of memory cells connected to the word line WL2 can be executed. Then, the same write data of four pages (P8 to P11) as the write data of the four pages (P8 to P11) used in the foggy write operation to the word line WL2 is transferred again to the NAND flash memory 5 in a page unit, and the fine write operation for writing the write data of the four pages (P8 to P11) to the plurality of memory cells connected to the word line WL2 in the QLC block #1 is executed. The foggy-fine write operation for pages P8 to P11 is thereby finished. As a result, the data corresponding to the pages P8 to P11 can be read correctly from the QLC block #1.

FIG. 7 is a block diagram illustrating a configuration example of the flash management unit 20.

In the controller 4 of the SSD 3, a plurality of reorder command buffers 23-1 to 23-M corresponding to the plurality of zones in the open state are managed. The reorder command buffer 23-1 is used to reorder the plurality of write commands to write data to Zone #1 in the open state in an order in which the writing within this zone is executed sequentially. The reorder command buffer 23-2 is used to reorder the plurality of write commands to write data to Zone #2 in the open state in an order in which the writing within Zone #2 is executed sequentially. The reorder command buffer 23-3 is used to reorder the plurality of write commands to write data to Zone #3 in the open state in an order in which the writing within Zone #3 is executed sequentially. Similarly, the reorder command buffer 23-M is used to reorder the plurality of write commands to write data to Zone #M in the open state in an order in which the writing within Zone #M is executed sequentially.

In the host 2, each I/O command (read command and write command) is placed into any one of one or more submission queues SQ of the host 2. By employing the write command reordering function of the SSD 3, the host 2 is permitted to place write commands to write data to the same zones into the submission queues SQ in any order. For this reason, the host 2 is, without awaiting receiving from the SSD 3 a response indicative of completion of the write command to write data to a certain zone, permitted to place the other write command to write data to this zone into one of one or more submission queues SQ. Therefore, since the host 2 can place the plurality of write commands for the same zone into one or more submission queues SQ, write throughput can be improved.

In addition, a system environment of sharing certain zones in the SSD 3 by different applications or different virtual machines can also be implemented. In this case, the host software may assign a part of the LBA range assigned to a certain zone to one application (or one virtual machine) of applications (or virtual machines) sharing this specific zone as an available LBA range and may assign the other part of this LBA range to the other application (or the other virtual machine) of the applications (or the virtual machines) sharing this specific zone as an available LBA range.

Each of the commands stored in the submission queue SQ is fetched by the command fetcher 21. When the command fetched by the command fetcher 21 is a read command, the read command is rapidly sent from the command fetcher 21 to the command dispatcher 22.

The logical address included in the read command is indicative of a read target zone, and the offset within the read target zone where the read target data is stored. The command dispatcher 22 reads the read target data from the read target zone by sending a read command sequence for reading the read target data to the NAND flash memory 5. The command dispatcher 22 transfers the read target data which has been read to a read buffer 52 in a host memory 50A by using the DMAC 15. Then, the command dispatcher 22 transmits a response indicative of completion of the read command to the host 2. In this case, the command dispatcher 22 places the response indicative of completion of the read command to the completion queue CQ of the host 2.

As for the write command, the following process is performed.

The command fetcher 21 classifies write commands fetched from the submission queue SQ into M+1 groups corresponding to Zones #1 to #M. Then, the command fetcher 21 reorders a set of the write commands classified into the group corresponding to Zone #1 in an order in which the writing within Zone #1 is executed sequentially from a next write location within Zone #1, by using the reorder command buffer 23-1 corresponding to Zone #1. The reordering is executed based on the offset and data size specified by each of the write commands classified into the group corresponding to Zone #1.

Similarly, the command fetcher 21 reorders a set of the write commands classified into the group corresponding to Zone #M in an order in which the writing within Zone #M is executed sequentially from a next write location within Zone #M, by using the reorder command buffer 23-M corresponding to Zone #M. The reordering is executed based on the offset and data size specified by each of the write commands classified into the group corresponding to Zone #M.

The command dispatcher 22 executes the write commands reordered in each of the reorder command buffers 23-1 to 23-M in the same order as the order of the reordered write commands.

For example, as for Zone #1, the command dispatcher 22 transfers, from the write buffer 51 to the internal buffer 161, a plurality of write data associated with the plurality of write commands reordered in the reorder command buffer 23-1, by using the DMAC 15, in the same order as the order of the plurality of write commands reordered, i.e., the same order as the order of writing the plurality of write data within Zone #1 (DMA Transfer).

Thus, the plurality of write commands to write data to the same zone are reordered in the order in which the writing within this zone is executed sequentially. Then, the DMA transfer of the plurality of write data associated with the plurality of write commands is not executed in the same order as the order of receiving the write commands, but executed in the same order as the order of the reordered write commands. Therefore, DMA transfer of the write data associated with the write command arranged behind the other write command by reordering the write commands is executed after DMA transfer of the write data associated with the other write command (Delayed DMA).

Then, the command dispatcher 22 writes the plurality of write data transferred to the internal buffer 161 to the first storage region in the NAND flash memory 5, which is managed as Zone #1, by sending, to the NAND flash memory 5, one or more program command sequences for writing the data.

When writing of certain write data is completed, the command dispatcher 22 transmits a response (completion response) indicative of the completion of the write command corresponding to the write data to the host 2. This response is also referred to as a write completion message.

The process of transmitting, to the host 2, the response indicative of the completion of each of the write commands is not executed in the order of receiving the write commands, but executed in the same order as the order of the reordered write commands. Therefore, the response indicative of the completion of the write command arranged behind the other write command by the reordering is transmitted to the host 2 after the response indicative of the completion of the other write command is transmitted (Delayed completion).

FIG. 8 is a block diagram illustrating the other configuration example of the flash management unit 20.

The flash management unit 20 illustrated in FIG. 8 is different from the flash management unit 20 illustrated in FIG. 7 with respect to a feature of further comprising a function of executing two-phase write completion.

That is, the command dispatcher 22 of the flash management unit 20 transmits to the host 2 the following two-phase completion message including a first phase completion message and a second phase completion message for each write command.

First Phase: a first phase completion message is a response (intermediate acknowledgment) indicating that the write command from the host 2 is received (fetched) by the controller 4. That is, when the controller 4 receives (fetches) a write command from the host 2, the controller 4 (in this example, command dispatcher 22) transmits the first response indicating that receiving (fetching) the write command is completed to the host 2 as the first phase completion message. In this case, the first phase completion message is stored in the completion queue CQ of the host 2.

Second Phase: a second phase completion message is a response (delayed completion) indicating that writing to the NAND flash memory 5 is completed by the controller 4. That is, when writing certain write data to the NAND flash memory 5 is completed, the controller (in this example, command dispatcher 22) transmits the second response indicative of completion of the writing corresponding to the write command to the host 2 as the second phase completion message. In this case, the second phase completion message is also stored in the completion queue CQ of the host 2.

The first phase completion message may be used as a completion message to permit the host 2 to transmit the read command for reading the write data associated with the write command to the SSD 3. That is, when the controller 4 receives from the host 2 a read command to request reading data to be written to a certain zone after the first phase completion message corresponding to a certain write command is sent from the SSD 3 to the host 2, the controller 4 reads the data from, for example, the write buffer 51 of the host 2 and transmits the read data to the host 2. The data is already stored in the SLC buffer 201 in some cases as described later with reference to FIG. 11. In this case, the controller 4 may read the data from the SLC buffer 201 and transmit the read data to the host 2.

The second phase completion message may be used as a completion message to permit release of the region in the write buffer of the host 2 where the write data associated with this write command is stored, similarly to a normal completion message (completion) indicative of completion of the write command. In this case, when receiving the second phase completion message corresponding to a certain write command from the SSD 3, the host 2 may release the region in the write buffer 51 of the host 2 where the write data associated with this write command is stored.

FIG. 9 is a diagram illustrating an example of the write command reordering operation.

For example, it is assumed that the minimum write size of the block BLK #1 used as Zone #1 is the page size (for example, 16 Kbytes) and that the data size of the write data specified by each write command to write the data to Zone #1 is a multiple of the minimum write size. That is, each write data is assumed to have the same size as the minimum write size or the size which is an integer multiple of two or more of the minimum write size.

The flash management unit 20 manages an internal write pointer indicative of a next write location of each zone, similarly to the write pointer of the host 2. When Zone #1 is transitioned from the empty state to the open state, the next write location of Zone #1 indicated by the internal pointer is set at the starting LBA of Zone #1, i.e., LBA corresponding to a lead page P0 of the block BLK #1.

In the following descriptions, it is assumed that the command fetcher 21 receives from the host 2 write commands W1 to W5 specifying Zone #1 in an order of W1, W2, W3, W4 and W5. In addition, in the following descriptions, the data size of the write data indicated by each of the write commands W1 to W5 is assumed to be the same as the minimum write size.

The write command W1 is a write command specifying the first offset within Zone #1 (starting LBA of Zone #1). The first offset within Zone #1 corresponds to page P0 of the block BLK #1.

The write command W2 is a write command specifying the second offset within Zone #1. The second offset within Zone #1 corresponds to page P1 of the block BLK #1.

The write command W3 is a write command specifying the fifth offset within Zone #1. The fifth offset within Zone #1 corresponds to page P4 of the block BLK #1.

The write command W4 is a write command specifying the fourth offset within Zone #1. The fourth offset within Zone #1 corresponds to page P3 of the block BLK #1.

The write command W5 is a write command specifying the third offset within Zone #1. The third offset within Zone #1 corresponds to page P2 of the block BLK #1.

(1) The command fetcher 21 fetches the write command W1 from the submission queue SQ of the host 2. The next write location within Zone #1 is set at the starting LBA of Zone #1, i.e., the first offset corresponding to page P0. Therefore, since the offset specified by the write command W1 matches the next write location within Zone #1, the command fetcher 21 passes through the reorder command buffer 23-1 and sends the write command W1 to the command dispatcher 22.

Based on the buffer address and the data size (for example, page size) specified by the write command W1, the command dispatcher 22 transfers the write data D0 associated with the write command W1 from the write buffer 51 in the host memory 50A to the internal buffer 161, by using the DMAC 15. The write data D0 has a size of the minimum write size (one page in this example). Then, the command dispatcher 22 writes the write data D0 to page P0 of the block BLK #1 by transmitting the program command sequence to the NAND flash memory die. When writing the write data D0 is completed, the command dispatcher 22 advances the next write location within Zone #1 by the data size of the write data D0. Since the data size of the write data D0 is one page, the next write location within Zone #1 is changed to the LBA corresponding to page P1.

(2) The command fetcher 21 fetches the write command W2 from the submission queue SQ of the host 2. The next write location within Zone #1 is set at the LBA corresponding to page P1. Therefore, since the offset specified by the write command W2 matches the next write location within Zone #1, the command fetcher 21 passes through the reorder command buffer 23-1 and sends the write command W2 to the command dispatcher 22.

Based on the buffer address and the data size specified by the write command W2, the command dispatcher 22 transfers the write data D1 associated with the write command W2 from the write buffer 51 in the host memory 50A to the internal buffer 161, by using the DMAC 15. The write data D1 has a size of the minimum write size (one page in this example). Then, the command dispatcher 22 writes the write data D1 to page P1 of the block BLK #1 by transmitting the program command sequence to the NAND flash memory die. When writing the write data D1 is completed, the command dispatcher 22 advances the next write location within Zone #1 by the data size of the write data D1. Since the data size of the write data D1 is one page, the next write location within Zone #1 is changed to the LBA corresponding to page P2.

(3) The command fetcher 21 fetches the write command W3 from the submission queue SQ of the host 2. The next write location within Zone #1 is set at the LBA corresponding to page P2. Therefore, since the offset specified by the write command W2 (i.e., the LBA corresponding to the page P4) does not match the next write location within Zone #1, the command fetcher 21 stores the write command W3 in the reorder command buffer 23-1.

(4) The command fetcher 21 fetches the write command W4 from the submission queue SQ of the host 2. The next write location within Zone #1 is set at the LBA corresponding to page P2. Therefore, since the offset specified by the write command W4 (i.e., the LBA corresponding to the page P3) does not match the next write location within Zone #1, the command fetcher 21 stores the write command W4 to the reorder command buffer 23-1. In this case, the offset specified by the write command W4 is smaller than the offset specified by the write command W3 already stored in the reorder command buffer 23-1. Therefore, the command fetcher 21 may change the order of the write command W4 and the write command W3 as illustrated in FIG. 9 such that the write command W4 and the write command W3 are arranged in this order in the reorder command buffer 23-1.

(5) The command fetcher 21 fetches the write command W5 from the submission queue SQ of the host 2. The next write location within Zone #1 is set at the LBA corresponding to page P2. Therefore, the offset specified by the write command W5 (i.e., the LBA corresponding to the page P2) matches the next write location within Zone #1. Therefore, the command fetcher 21 passes through the reorder command buffer 23-1 and sends the write command W5 to the command dispatcher 22.

Based on the buffer address and the data size specified by the write command W5, the command dispatcher 22 transfers the write data D2 associated with the write command W5 from the write buffer 51 in the host memory 50A to the internal buffer 161, by using the DMAC 15. The write data D2 has a size of the minimum write size (one page in this example). Then, the command dispatcher 22 writes the write data D2 to page P2 of the block BLK #1 by transmitting the program command sequence to the NAND flash memory die. When writing the write data D2 is completed, the command dispatcher 22 advances the next write location within Zone #1 by the data size of the write data D2. Since the data size of the write data D2 is one page, the next write location within Zone #1 is changed to the LBA corresponding to page P3.

The command fetcher 21 searches the reorder command buffer 23-1 for a write command to specify the next write location within Zone #1 (i.e., the LBA corresponding to the page P3). Since the offset specified by the write command W4 matches the next write location within Zone #1 (i.e., the LBA corresponding to page P3), the command fetcher 21 acquires the write command W4 from the reorder command buffer 23-1 and sends the write command W4 to the command dispatcher 22.

Based on the buffer address and the data size specified by the write command W4, the command dispatcher 22 transfers the write data D3 associated with the write command W4 from the write buffer 51 in the host memory 50A to the internal buffer 161, by using the DMAC 15. The write data D3 has a size of the minimum write size (one page in this example). Then, the command dispatcher 22 writes the write data D3 to page P3 of the block BLK #1 by transmitting the program command sequence to the NAND flash memory die. When writing the write data D3 is completed, the command dispatcher 22 advances the next write location within Zone #1 by the data size of the write data D3. Since the data size of the write data D3 is one page, the next write location within Zone #1 is changed to the LBA corresponding to page P4.

The command fetcher 21 searches the reorder command buffer 23-1 for a write command to specify the next write location within Zone #1 (i.e., the LBA corresponding to the page P4). Since the offset specified by the write command W3 matches the next write location within Zone #1 (i.e., the LBA corresponding to page P4), the command fetcher 21 acquires the write command W3 from the reorder command buffer 23-1 and sends the write command W3 to the command dispatcher 22.

Based on the buffer address and the data size specified by the write command W3, the command dispatcher 22 transfers the write data D4 associated with the write command W3 from the write buffer 51 in the host memory 50A to the internal buffer 161, by using the DMAC 15. The write data D4 has a size of the minimum write size (one page in this example). Then, the command dispatcher 22 writes the write data D4 to page P4 of the block BLK #1 by transmitting the program command sequence to the NAND flash memory die. When writing the write data D4 is completed, the command dispatcher 22 advances the next write location within Zone #1 by the data size of the write data D4. Since the data size of the write data D4 is one page, the next write location within Zone #1 is changed to the LBA corresponding to page P5.

Thus, the write command W1, the write command W2, the write command W3, the write command W4, and the write command W5 are reordered in the order in which the writing within Zone #1 can be executed sequentially from the next write location within Zone #1 in equal to or larger than the minimum write size (in this example, more than an integer multiple of more than two of the minimum write size), i.e., in the order of the write command W1, the write command W2, the write command W5, the write command W4, and the write command W3. Then, five write data associated with the respective write commands W1 to W5 are transferred from the write buffer 51 of the host 2 to the internal buffer 161 in the same order as the order in which the write commands W1 to W5 are reordered (W1, W2, W5, W4, and W3), i.e., in the order of D0, D1, D2, D3, and, D4.

FIG. 10 is a diagram illustrating another example of the write command reordering operation.

In this example, it is assumed that the minimum write size of the block BLK #1 used as Zone #1 is the page size (for example, 16 Kbytes) and that the minimum data size (sector size) of the write data which can be specified by the host 2 is 4 KB.

In the following descriptions, it is assumed that the command fetcher 21 receives write commands W11 to W16 specifying Zone #1 in an order of W11, W12, W13, W14, W15, and W16 from the host 2.

The offset (offset=0) specified by the write command W11 is indicative of a lead sector S0 of Zone #1 (i.e., starting LBA of Zone #1) and the data size specified by the write command W11 is 4 KB.

The offset (offset=2) specified by the write command W12 is indicative of a sector S2 of Zone #1 and the data size specified by the write command W12 is 8 KB.

The offset (offset=1) specified by the write command W13 is indicative of a sector S1 of Zone #1 and the data size specified by the write command W13 is 4 KB.

The offset (offset=5) specified by the write command W14 is indicative of a sector S5 of Zone #1 and the data size specified by the write command W14 is 4 KB.

The offset (offset=6) specified by the write command W15 is indicative of a sector S6 of Zone #1 and the data size specified by the write command W15 is 8 KB.

The offset (offset=4) specified by the write command W16 is indicative of a sector S4 of Zone #1 and the data size specified by the write command W16 is 4 KB.

In this case, the command fetcher 21 of the flash management unit 20 reorders the write commands W11 to W16 in the order of the write command W11, the write command W13, the write command W12, the write command W16, the write command W14, and the write command W15 as illustrated in the right part of FIG. 10 such that the writing within Zone #1 is executed sequentially in equal to or larger than the minimum write size (16 KB) from the next write location within Zone #1 (in this example, starting LBA of Zone #1).

That is, the command fetcher 21 receives the write command W11, the write command W12, and the write command W13 in this order from the host 2 and stores the write command W11, the write command W12, and the write command W13 in the reorder command buffer 23-1. Then, the command fetcher 21 changes the order of the write command W11, the write command W12, and the write command W13 to the order of the write command W11, the write command W13, and the write command W12.

The writing within Zone #1 can be executed sequentially from the next write location within Zone #1 (in this example, starting LBA of Zone #1) in equal to or larger than the minimum write size, by thus reordering the write command W11, the write command W12, and the write command W13.

More specifically, lead part of the contiguous logical addresses specified by the offsets and data sizes of the reordered write command W11, write command W13, and write command W12 matches the next write location within Zone #1 (in this example, starting LBA of Zone #1) and the data size corresponding to the contiguous logical addresses becomes the minimum write size (in this example, 16 KB). Therefore, the command fetcher 21 sends the reordered write command W11, write command W13, and write command W12 to the command dispatcher 22.

The command dispatcher 22 first transfers the write data D0 having a 4 KB size, which is associated with the write command W11, from the write buffer 51 of the host 2 to the internal buffer 161, by using the DMAC 15. Next, the command dispatcher 22 transfers the write data D1 having a 4 KB size, which is associated with the write command W13, from the write buffer 51 of the host 2 to the internal buffer 161, by using the DMAC 15. Then, the command dispatcher 22 transfers the write data D2 having a 8 KB size, which is associated with the write command W12, from the write buffer 51 of the host 2 to the internal buffer 161, by using the DMAC 15.

As a result, three write data (D0, D1, and D2) having a totally 16 KB size, which are to be written from the starting LBA of Zone #1, can be prepared in the internal buffer 161. The command dispatcher 22 writes the three write data (D0, D1, and D2) having a totally 16 KB size to page P0 of the block BLK #1.

The command dispatcher 22 changes the next write location within Zone #1 to the LBA corresponding to page P1.

The command fetcher 21 receives the write command W14, the write command W15, and the write command W16 in this order from the host 2 and stores the write command W14, the write command W15, and the write command W16 in the reorder command buffer 23-1. Then, the command fetcher 21 changes the order of the write command W14, the write command W15, and the write command W16 to the order of the write command W16, the write command W14, and the write command W15. Lead part of the contiguous logical addresses specified by the offsets and data sizes of the reordered write command W16, write command W14, and write command W15 matches the next write location within Zone #1 (in this example, offset=sector S4) and the data size corresponding to the contiguous logical addresses is 16 KB. Therefore, the command fetcher 21 sends the reordered write command W16, write command W14, and write command W15 to the command dispatcher 22.

The command dispatcher 22 first transfers the write data D3 having a 4 KB size, which is associated with the write command W16, from the write buffer 51 of the host 2 to the internal buffer 161, by using the DMAC 15. Next, the command dispatcher 22 transfers the write data D4 having a 4 KB size, which is associated with the write command W14, from the write buffer 51 of the host 2 to the internal buffer 161, by using the DMAC 15. Then, the command dispatcher 22 transfers the write data D5 having a 8 KB size, which is associated with the write command W15, from the write buffer 51 of the host 2 to the internal buffer 161, by using the DMAC 15. As a result, three write data (D3, D4, and D5) having a totally 16 KB size, which are to be written from the fifth sector (sector S4) of Zone #1, can be prepared in the internal buffer 161. The command dispatcher 22 writes the three write data (D3, D4, and D5) having a totally 16 KB size to page P1 of the block BLK #1.

Thus, the flash management unit 20 determines whether the conditions that the lead of the contiguous logical addresses specified by the plurality of write commands reordered matches the next write location within Zone #1 and that the data size corresponding to the contiguous logical addresses is equal to or larger than the minimum write size, are satisfied or not. Then, when the conditions are satisfied, the flash management unit 20 transfers the plurality of write data associated with the plurality of write commands reordered from the write buffer 51 of the host 2 to the internal buffer 161, in the same order as the order of the plurality of write commands reordered.

Thus, the plurality of write data having a total size equal to or larger than the minimum write size can be transferred from the write buffer 51 of the host 2 to the internal buffer 161, in the same order as the order of the plurality of write commands reordered. Therefore, the order of the write data transferred to the internal buffer 161 matches the order of writing of the write data within Zone #1. Therefore, it is possible to prevent the internal buffer 161 from being occupied for a long time by several write data that are to be written to locations different from the next write location within Zone #1, and the size of the internal buffer 161 which needs to be provided in the SSD 3 can be reduced.

Furthermore, the writing within each zone can be executed sequentially even if the host 2 does not strictly manage the order of issuing the write commands to the same zone.

In a case where the first storage region used as Zone #1 is implemented by the QLC block, when the conditions that the lead part of the contiguous logical addresses specified by the offsets and data sizes of the plurality of write commands reordered matches the next write location within Zone #1 and the data size corresponding to the contiguous logical addresses is equal to or larger than the minimum write size (minimum write size=four pages, for example, 64 KB) of the QLC block, are satisfied, transfer of the plurality of write data corresponding to the plurality of write commands reordered is started.

Figure 11:
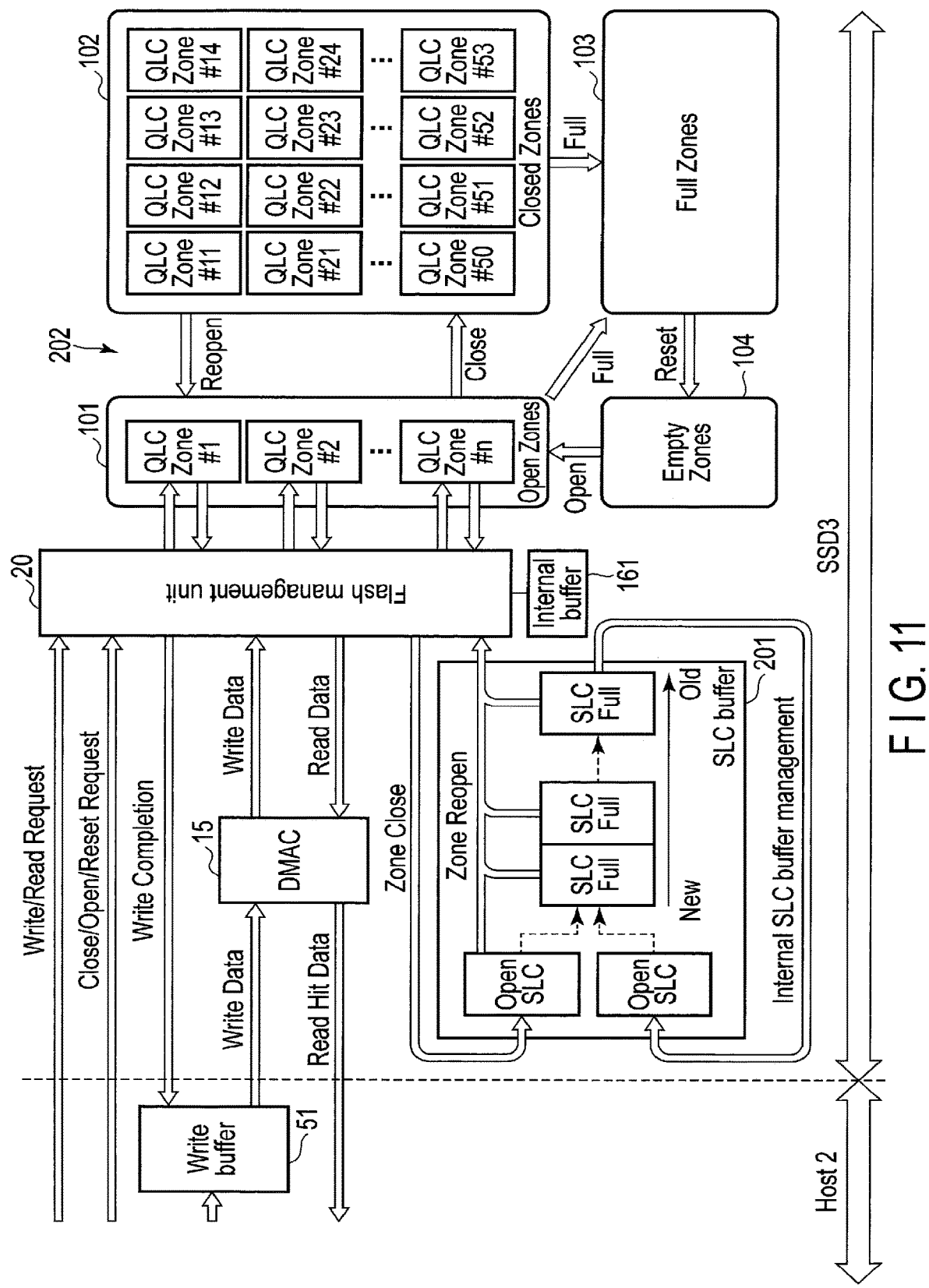
FIG. 11 is a block diagram illustrating a sequence of a write operation and a sequence of a read operation executed in the memory system according to the embodiment.

FIG. 11 is a block diagram illustrating a sequence of the write operation and a sequence of the read operation executed in the SSD 3.

In the following descriptions, it is assumed that the first storage region used as each zone is implemented as the QLC block. The QLC block may be one QLC physical block or a QLC super block including a set of a plurality of QLC physical blocks. Each QLC block used as the zone is hereinafter referred to as a QLC zone.

States of each QLC zone are roughly classified into the open state (open zone), close state (close zone), full state (full zone), and empty state (empty zone).

The QLC zone in the open state is a zone allocated as a write destination zone where data write can be executed. The flash management unit 20 manages each QLC zone in the open state by using an open zone list 101.

The QLC zone in the close state is a QLC zone where writing is suspended. The QLC zone where writing is suspended is a QLC zone where data is written in only a part of the logical address range of the QLC zone, i.e., a QLC zone which is partially written. In the QLC zone in the close state, the logical address range available for data write is left. The flash management unit 20 manages each QLC zone in the close state by using a close zone list 102.

The QLC zone in the full state is a QLC zone which is fully filled with data. The flash management unit 20 manages each QLC zone in the open state by using a full zone list 103.

The QLC zone in the empty state is a QLC zone which is reset. The QLC zone in the empty state corresponds to a free QLC block. The flash management unit 20 manages each QLC zone in the empty state by using an empty zone list 104.

The host 2 can set a plurality of QLC zones to be in the open state by repeating a process of transmitting an open zone command (open request) to the SSD 3.

When the flash management unit 20 receives write commands (write requests) to write the data to the QLC zone #1 in the open state from the host 2, the flash management unit 20 transfers the write data of the minimum write size from the write buffer 51 of the host 2 to the internal buffer 161 by using the DMAC 15. Then, the flash management unit 20 does not write the write data which is transferred to the internal buffer 161 to the SLC buffer 201, but writes the write data to the QLC zone #1 alone.

In addition, when the flash management unit 20 receives write commands (write requests) to write the data to the QLC zone #2 in the open state from the host 2, the flash management unit 20 transfers the write data of the minimum write size from the write buffer 51 of the host 2 to the internal buffer 161 by using the DMAC 15. Then, the flash management unit 20 does not write the write data which is transferred to the internal buffer 161 to the SLC buffer 201, but writes the write data to the QLC zone #2 alone.

When writing the data to a QLC zone in the open state is not executed for a while, the host 2 transmits a close zone command (close request) to transition the QLC zone to the close state to the SSD 3 in order to allow the region in the write buffer 51 of the host 2, which is allocated for the QLC zone, to be released.

When receiving a close zone command (close request) to specify the logical address indicative of QLC zone #1 from the host 2, a write command which does not start being written to the QLC zone #1 may be stored in the reorder command buffer 23-1. This is because the write data associated with the respective write commands may not be transferred from the write buffer 51 of the host 2 to the internal buffer 161 until write commands to specify the 4-page contiguous logical addresses from the next write location of QLC zone #1 are stored in the reorder command buffer 23-1.

The flash management unit 20 transfers remaining write data un-transferred to the internal buffer 161, of the plurality of write data associated with the plurality of write commands received specifying a logical address indicative of the QLC zone #1, from the write buffer 51 of the host 2 to the internal buffer 161, by using the DMAC 15. The flash management unit 20 does not write the remaining write data transferred to the internal buffer 161 to the QLC zone #1, but writes the remaining write data transferred to the internal buffer 161 to the SLC buffer 201. A minimum write size of the SLC buffer 201 is smaller than the minimum write size of QLC zone #1.

Therefore, even when the size of the remaining write data is smaller than the minimum write size (four pages) of each QLC zone, a process of persistently storing the remaining write data can be rapidly executed.

When the write data which does not finish being written to the QLC zone #1, for example, the write data which finishes the only foggy write operation and does not finish the fine write operation exists in the internal buffer 161, the flash management unit 20 also writes the write data to the SLC buffer 201 together with the remaining write data.

In the QLC zone #1, the write operation (fine write operation) of certain write data of four pages can be started after write data of next four pages to be written to the QLC zone #1 is received. Therefore, if the process of writing the remaining write data to the QLC zone #1 is executed, writing the write data of last four pages, of the remaining write data, may not be completed.

In this case, the write data of four pages cannot be read from the QLC zone #1. Therefore, the region in the write buffer 51 of the host 2 where the write data of four pages is stored cannot be released.

In the embodiment, as described above, since all the remaining write data can be written to the SLC buffer 201 together with the write data which does not finish writing to the QLC zone #1, the whole region in the write buffer 51 of the host 2, which is allocated for the QLC zone #1, can be released.

Then, the flash management unit 20 causes the QLC zone #1 to transition to the close state. In this case, the flash management unit 20 removes the QLC zone #1 from the open zone list 101 and adds the QLC zone #1 to the close zone list 102.

The SLC buffer 201 may include a plurality of SLC blocks. The flash management unit 20 writes the remaining write data to a write destination SLC block (open SLC) which is open in the SLC buffer 201, in a write mode of writing 1 bit per memory cell. When the whole write destination SLC block is filled with the data, the flash management unit 20 manages the write destination SLC block as the SLC block in the full state.

The flash management unit 20 selects the oldest SLC block, of a set of the SLC blocks in the full state, as a copy source block for garbage collection (GC) of the SLC buffer 201. Then, the flash management unit 20 copies valid data stored in the copy source block to a write destination SLC block (open SLC) for GC. The flash management unit 20 updates the L2P table 31 and maps the physical address indicative of the storage location in the write destination SLC block to which the valid data is copied, to the logical address of the copied valid data. When copying all the valid data in the copy source block is completed, the flash management unit 20 manages the copy source block as a free SLC block which does not include the valid data.

The QLC zone #1 caused to transition to the close state includes the remaining LBA range available to write the data. Therefore, the host 2 can transmit to the SSD 3 the write command to write the data to the remaining LBA range available within QLC zone #1 in the close state, as needed.

When receiving from the host 2 one or more write commands to write the data to the QLC zone #1 in the close state, the flash management unit 20 reads the write data for the QLC zone #1 which is stored in the SLC buffer 201 from the SLC buffer 201 and stores the read write data to the internal buffer 161. The write data for the QLC zone #1 is thereby transferred from the SLC buffer 201 to the internal buffer 161. Then, the write data transferred from the SLC buffer 201 to the internal buffer 161 is written to the QLC zone #1 after, for example, one or more subsequent write commands to write data to the QLC zone #1 are received. In this case, the write data for the QLC zone #1 associated with one or more subsequent write commands is transferred from the write buffer 51 of the host 2 to the internal buffer 161, and the write data transferred from the SLC buffer 201 to the internal buffer 161 is written to the QLC zone #1 together with the write data for the QLC zone #1 transferred from the write buffer 51 of the host 2 to the internal buffer 161.

In addition, as regards each of the QLC zones in the open state, the close state, or the full state, the flash management unit 20 manages a readable area of the QLC zone and storage location information indicative of each storage location where data unreadable from this QLC zone is stored, by using the zone management table 32.

Each storage location is the storage location in the SLC buffer 201 or the storage location in the write buffer 51 of the host 2. Each storage location may be managed in units of, for example, a sector having a size of 4 KB.

When the flash management unit 20 receives from the host 2 a read command (read request) specifying (i) the LBA indicative of both the QLC zone and the offset within this QLC zone, and (ii) the data size of the read target data, the flash management unit 20 determines whether or not the LBA range corresponding to the read target data is included in the readable area of the QLC zone. The LBA range corresponding to the read target data is determined by the offset and the data size each specified by the read command.

When the LBA range corresponding to the read target data is included in the readable area of the QLC zone, the flash management unit 20 reads the read target data from the QLC zone and transmits the read target data as the read hit data to the host 2 by using the DMAC 15.

When the LBA range corresponding to the read target data is not included in the readable area of the QLC zone, the flash management unit 20 reads the read target data from the SLC buffer 201 or the write buffer 51 of the host 2, based on the storage location information corresponding to this QLC zone, and transmits the read target data as the read hit data to the host 2 by using the DMAC 15.

In the process of reading the read target data from the write buffer 51 of the host 2, the flash management unit 20 first acquires the read target data from the write buffer 51 of the host 2 by using the DMAC 15. Then, the flash management unit 20 transfers the acquired read target data to the read buffer 52 of the host 2 by using the DMAC 15.

Alternatively, the flash management unit 20 may execute a process of notifying the host 2 that the read target data does not exist in the SSD 3, instead of reading the read target data from the write buffer 51 of the host 2. In this case, the flash management unit 20 may notify the host 2 of the location in the write buffer 51 of the host 2 where the read target data exists.

In the QLC zone of the full state filled with the data, the whole LBA range of this QLC zone is managed as the readable area.

When all data stored in the QLC zone in the full state become unnecessary data that are not used, the host 2 can transmit the reset zone command (reset request) specifying the logical address indicative of this QLC zone to the SSD 3. In response to receiving this reset zone command (reset request) from the host 2, the flash management unit 20 causes the state of this QLC zone to transition to the empty state.

When the host 2 wishes to write the data to the QLC zone in the empty state, the host 2 transmits the open zone command (open request) specifying the logical address indicative of the QLC zone in the empty state to the SSD 3. In response to receiving this open zone command (open request) from the host 2, the flash management unit 20 executes the erase operation for the QLC block used as this QLC zone and causes the state of this QLC zone to the open state.

Figure 12:
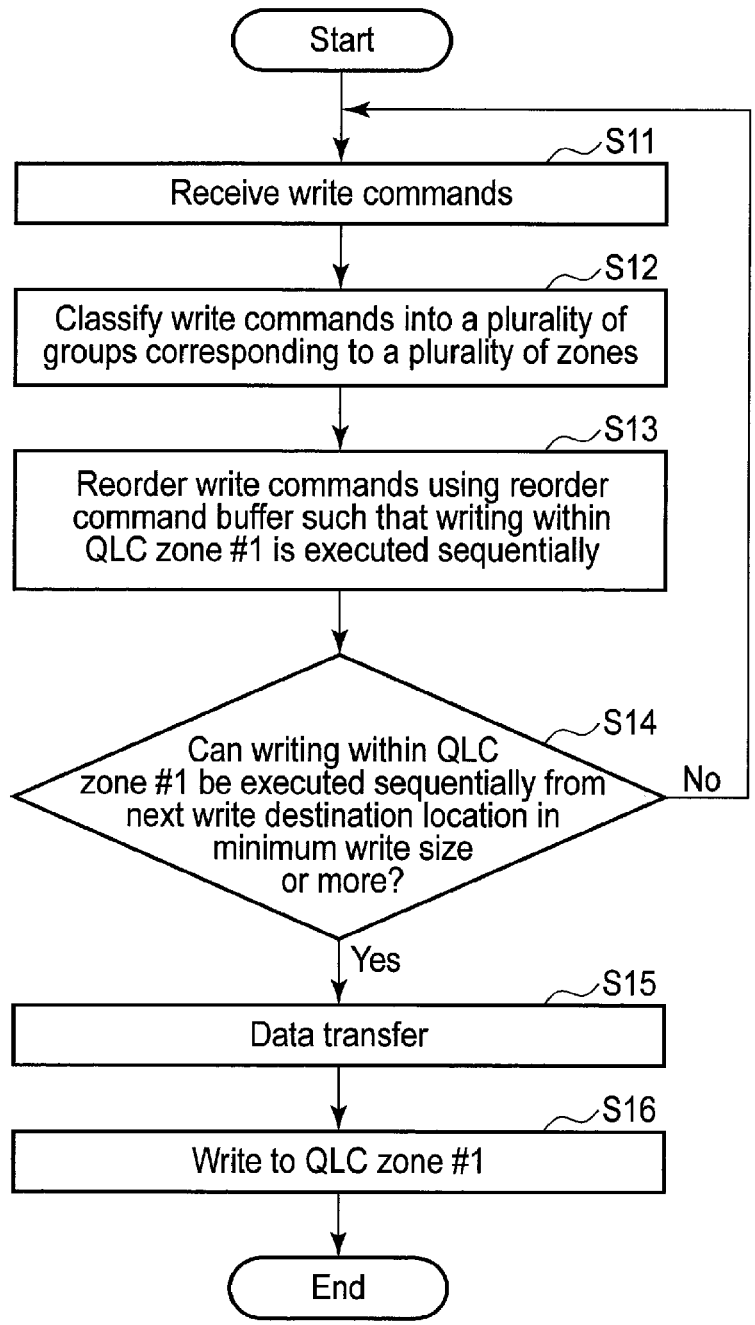
FIG. 12 is a flowchart illustrating a procedure of the write operation executed in the memory system according to the embodiment.

FIG. 12 is a flowchart illustrating a procedure of the write operation executed in the SSD 3.

The controller 4 of the SSD 3 receives write commands from the host 2 (step S11). Each of these write commands specifies (i) the logical address (LBA) indicative of both a QLC zone and an offset within this QLC zone, (ii) the data size of the write data, and (iii) the location in the write buffer 51 of the host 2 where the write data is stored.

The controller 4 classifies the received write commands into a plurality of groups corresponding to the plurality of QLC zones in the open state (step S12). The controller 4 reorders the write commands belonging to the same group by using a reorder command buffer corresponding to the same group such that the writing within each QLC zone is executed sequentially.

The operation of reordering a plurality of write commands for writing data to the QLC zone #1 will be explained in the following descriptions. The plurality of write commands for writing data to the QLC zone #1 are referred as first write commands.

Each of the write commands (first write commands) for writing data to the QLC zone #1 specifies the QLC zone #1, the offset within the QLC zone #1 where the write data is to be written, the data size of the write data, and the location in the write buffer 51 of the host 2 where the write data is stored.

The QLC zone #1 is specified by the upper bit portion of the LBA included in each first write command, and the offset within QLC zone #1 is specified by the lower bit portion of the LBA included in each first write command.

Based on the offset and the data size specified by each of the plurality of first write commands received, the controller 4 reorders the plurality of first write commands received in an order in which the writing within QLC zone #1 is sequentially executed from a next write location within QLC zone #1, by using the reorder command buffer 23-1 corresponding to the QLC zone #1 (step S13).

The controller 4 determines whether or not the writing within QLC zone #1 can be executed sequentially in equal to or larger than the minimum write size from the next write location within QLC zone #1 (step S14). The processes in steps S11 to S13 are repeated until the writing within QLC zone #1 becomes capable of being executed sequentially in equal to or larger than the minimum write size from the next write location within QLC zone #1.

In step S14, the controller 4 may determine whether or not the conditions that the lead part of the contiguous logical addresses specified by the offsets and the data sizes of the plurality of first write commands reordered matches the next write location within QLC zone #1 and the data size corresponding to the contiguous logical addresses is equal to or larger than the minimum write size, are satisfied. Then, when the conditions are satisfied, the controller 4 may determine that the writing within QLC zone #1 can be executed sequentially in equal to or larger than the minimum write size from the next write location within QLC zone #1.

When the writing within QLC zone #1 can be executed sequentially in equal to or larger than the minimum write size from the next write location within QLC zone #1 (YES in step S14), the controller 4 transfers the plurality of write data associated with the plurality of first write commands reordered, from the write buffer 51 of the host 2 to the internal buffer 161, in the same order as the order of the plurality of first write commands reordered, based on the plurality of first write commands reordered (step S15).

Then, the controller 4 writes the plurality of write data transferred to the internal buffer 161 to one of the plurality of QLC blocks that is managed as the QLC zone #1 (step S16). In step S16, every time the writing one write data to the QLC block is completed, the controller 4 transmits to the host 2 a response indicative of the completion of the first write command corresponding to the write data whose writing is completed. That is, when one write data associated with a certain first write command is written to the QLC block, the controller 4 transmits to the host 2 a response indicative of the completion of this first write command.

In a case where the two-phase write completion is applied, when receiving one of a plurality of write commands from the host 2 the controller 4 transmits to the host 2 a first response indicative of completion of the reception of this write command as the above-described first phase completion message, and when completing the writing of the write data to the QLC block the controller 4 transmits to the host 2 a second response indicative of completion of the writing corresponding to the write command corresponding to this write data as the above-described second phase completion message.

In step S13, the controller 4 may execute the following process.

For example, it is assumed that the LBA range which can be covered with the reorder command buffer 23-1 corresponding to the QLC zone #1 is narrower than the LBA range assigned to the QLC zone #1. In this case, the controller 4 manages the LBA range covered with the reorder command buffer 23-1 as the writable LBA range of QLC zone #1. As the writing within QLC zone #1 proceeds, the LBA range covered with the reorder command buffer 23-1 moves from the lead to the end of the LBA range of QLC zone #1. Therefore, when receiving the first write command which specifies as the offset a LBA located to the end side of QLC zone #1 than the current LBA range covered with the reorder command buffer 23-1, the controller 4 does not store the first write command in the reorder command buffer, and transmits to the host 2 a response indicative of a temporary error for this first write command.

Thus, the write command which is permitted to be stored in the reorder command buffer 23-1 can be limited to each first write command belonging to the current writable LBA range of QLC zone #1 and, consequently, reordering the write commands to enable the writing within QLC zone #1 to be executed sequentially can be executed efficiently.

As described above, as the writing to the QLC zone #1 proceeds, the current LBA range covered with the reorder command buffer moves. Therefore, a specific LBA specified by the above write command which becomes an error is included in the current LBA range covered with the reorder command buffer on a future occasion. After that, when receiving again from the host 2 the first write command that specifies the above specific LBA as the offset, the controller 4 can normally process the received first write command.

Figure 13:
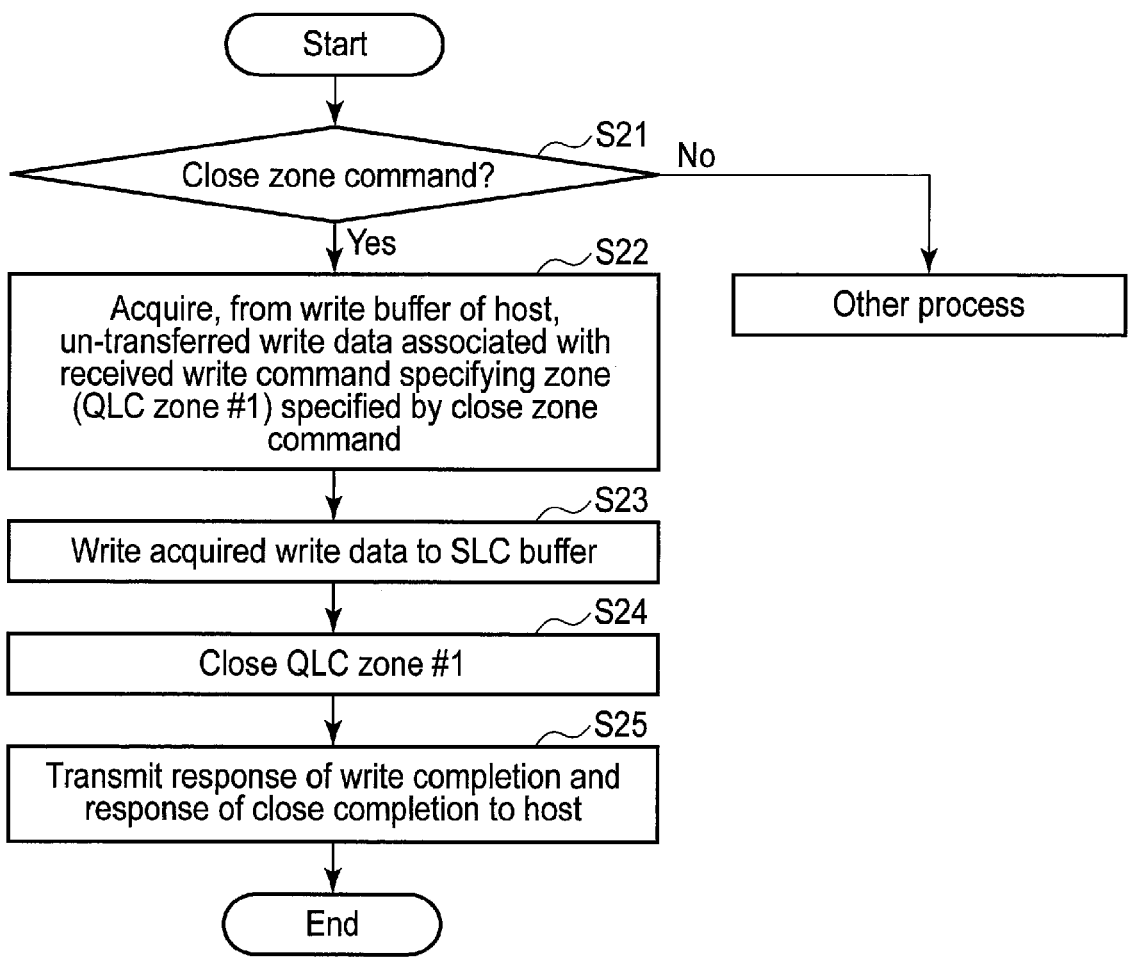
FIG. 13 is a flowchart illustrating a procedure of an operation executed in the memory system according to the embodiment in response to reception of a close zone command.

FIG. 13 is a flowchart illustrating a procedure of the operation executed in the SSD 3 in response to reception of the close zone command.

When receiving from the host 2 the close zone command to cause the open QLC zone (for example, QLC zone #1) to transition to the close state in which the writing is suspended (YES in step S21), the controller 4 acquires remaining write data un-transferred to the internal buffer 161, of the plurality of write data associated with the plurality of received write commands each specifying the QLC zone #1, from the write buffer 51 of the host 2, and stores the acquired write data in the internal buffer 161 (step S22).

In order to rapidly execute a process of persistently storing all remaining write data to be written to the QLC zone #1 which is to be made to transition to the close state, the controller 4 writes the acquired write data not to the QLC zone #1, but to the SLC buffer 201 (step S23). In step S23, write data in the internal buffer 121 in which the fine write operation to the QLC zone #1 is not completed is also written to the SLC buffer 201. Then, the controller 4 causes the state of QLC zone #1 to transition to the close state (step S24).

Next, the controller 4 transmits to the host 2 a response indicative of completion of each write command corresponding to each write data written to the SLC buffer 201, and a response indicative of completion of the close zone command (step S25).

Thus, the host 2 enables the region in the write buffer 51 of the host 2, which is allocated for the QLC zone #1, to be released.

FIG. 14 is a flowchart illustrating a procedure of the operation executed in the SSD 3 in response to reception of the write command for the QLC zone in the close state.

When receiving from the host 2 the write command to write the data to the QLC zone (for example, QLC zone #1) in the close state (YES in step S31), the controller 4 re-opens the QLC zone #1 and causes the state of QLC zone #1 to transition from the close state to the open state (step S32).

Then, the controller 4 transfers the write data for the QLC zone #1 stored in the SLC buffer 201 from the SLC buffer 201 to the internal buffer 161 (step S33), and executes a write process of writing, to the QLC zone #1, the write data transferred from the SLC buffer 201 to the internal buffer 161 and the write data for the QLC zone #1 newly transferred from the write buffer 51 of the host 2 to the internal buffer 161 (step S34).

FIG. 15 is a sequence chart illustrating an example of a process of notifying the SSD 3 of an access limit of each zone from the host 2.

The zone access limit means a time period (time limit) from the time when the write access (writing) to the zone is started to the time when this zone becomes a full state. When the time elapsed from the start of writing to a certain zone until this zone becomes a full state is too long, reliability of the block of the NAND flash memory 5 used as this zone cannot be assured in some cases. For this reason, normally, the zone access limit is limited below a certain threshold value (threshold time).

However, in a case of, for example, using different QLC zones for writing executed by different applications (or different clients), when the frequency of data write from a certain application (or a certain client) is low or the data write amount from a certain application (or a certain client) is small, the write speed to the QLC zone used by this application often becomes slower. In this case, the zone access limit of this QLC zone may become longer than the limit time (threshold time).

When the time elapsed from the start of writing to this zone reaches the zone access limit before the zone becomes a full state, the controller 4 may send to the host 2 a notice to recommend this zone to transition to the full state. Alternatively, the controller 4 may execute a process of forcing this zone to transition to the full state. In any case, however, when the time elapsed from the start of writing to the zone exceeds the zone access limit, the reliability of the block of the NAND flash memory 5 corresponding to this zone may be lowered or subsequent write to this block may not be able to be executed normally.

For this reason, the controller 4 has a function of maintaining write commands for a specific QLC zone where the data write frequency is low or the data write amount is small in the reorder command buffer and thereby delaying the start of writing to this specific QLC zone. This specific QLC zone is also referred to as "slow write zone".

More specifically, when the zone access limit (i.e., the time elapsed from start of the write access to the QLC zone #1 until the whole QLC zone #1 is filled with the data) of a certain QLC zone (for example, QLC zone #1) specified by the host 2 is longer than the threshold value, the controller 4 does not start writing to the QLC zone #1 until the total data size of the plurality of write data associated with the plurality of first write commands reordered reaches the capacity of QLC zone #1 (slow write zone) or until the controller 4 receives from the host 2 an instruction (finish zone command) to cause the QLC zone #1 to transition to the full state.

The controller 4 starts transferring the plurality of write data from the write buffer 51 of the host 2 to the internal buffer 161 after the total data size of the plurality of write data associated with the plurality of first write commands reordered reaches the capacity of QLC zone #1 (slow write zone) or when the controller 4 receives from the host 2 the instruction (finish zone command) to cause the QLC zone #1 to transition to the full state.

Then, the controller 4 writes the plurality of write data transferred to the internal buffer 161 to the first storage region (QLC block) used as the QLC zone #1 and thereby sets the first storage region (QLC block) to the full state in which the whole first storage region (QLC block) is filled with the data.

When the controller 4 receives from the host 2 the instruction (finish zone command) to cause the QLC zone #1 to transition to the full state before the total data size of the plurality of write data associated with the plurality of first write commands reordered reaches the capacity of QLC zone #1, the controller 4 sets the first storage region (QLC block) to the full state in which the whole first storage region (QLC block) is filled with the data, by writing the plurality of write data, and dummy data generated by the controller 4, to the first storage region (QLC block) used as the QLC zone #1.

More specifically, for example, the following operations are executed.

When the total data size of the plurality of write data associated with the plurality of first write commands reordered reaches the capacity of QLC zone #1 (slow write zone), the controller 4 executes an erase operation for the first storage region (QLC block) used as the QLC zone #1. The QLC zone #1 thereby becomes the open state.

Then, the controller 4 transfers the plurality of write data from the write buffer 51 of the host 2 to the internal buffer 161, and writes the plurality of write data transferred to the internal buffer 161 to the first storage region (QLC block) used as the QLC zone #1.

Thus, the zone access limit of the QLC zone corresponding to the QLC block can be extended without extending a period maintained in the state in which the QLC block is partially written (for example, a period from the time when the QLC block is opened to the time when the QLC block becomes the full state). When the controller 4 receives from the host 2 the instruction (finish zone command) to cause the QLC zone #1 to transition to the full state before the total data size of the plurality of write data associated with the plurality of first write commands reordered reaches the capacity of QLC zone #1, the QLC zone #1 cannot be made to be the full state by the plurality of write data alone. Therefore, the controller 4 writes the plurality of write data, and dummy data generated by the controller 4, to the first storage region (QLC block) used as the QLC zone #1.

The controller 4 may increase the size of the reorder command buffer corresponding to the QLC zone in which the zone access limit is to be extended such that the LBA range covered with this reorder command buffer increases to the LBA range of this QLC zone and, instead, may reduce the size of the reorder command buffer corresponding to each of the other QLC zones in which the zone access limit does not need to be extended.

The host 2 may notify the controller 4 of the zone access limit of each QLC zone. In this case, as illustrated in FIG. 15, the host 2 first specifies the zone access limit of QLC zone #1 for the SSD 3 (step S41). Next, the host 2 specifies the zone access limit of the QLC zone #2 for the SSD 3 (step S42), and specifies the zone access limit of the QLC zone 33 for the SSD 3 (step S43). Similarly, the host 2 specifies the zone access limit of the QLC zone #N for the SSD 3 (step S44).

The host 2 may specify for the SSD 3 the zone access limit of the zone which needs to be made to transition to the open state, by transmitting the open zone command including a parameter indicative of the zone access limit to the SSD 3.

Figure 16:
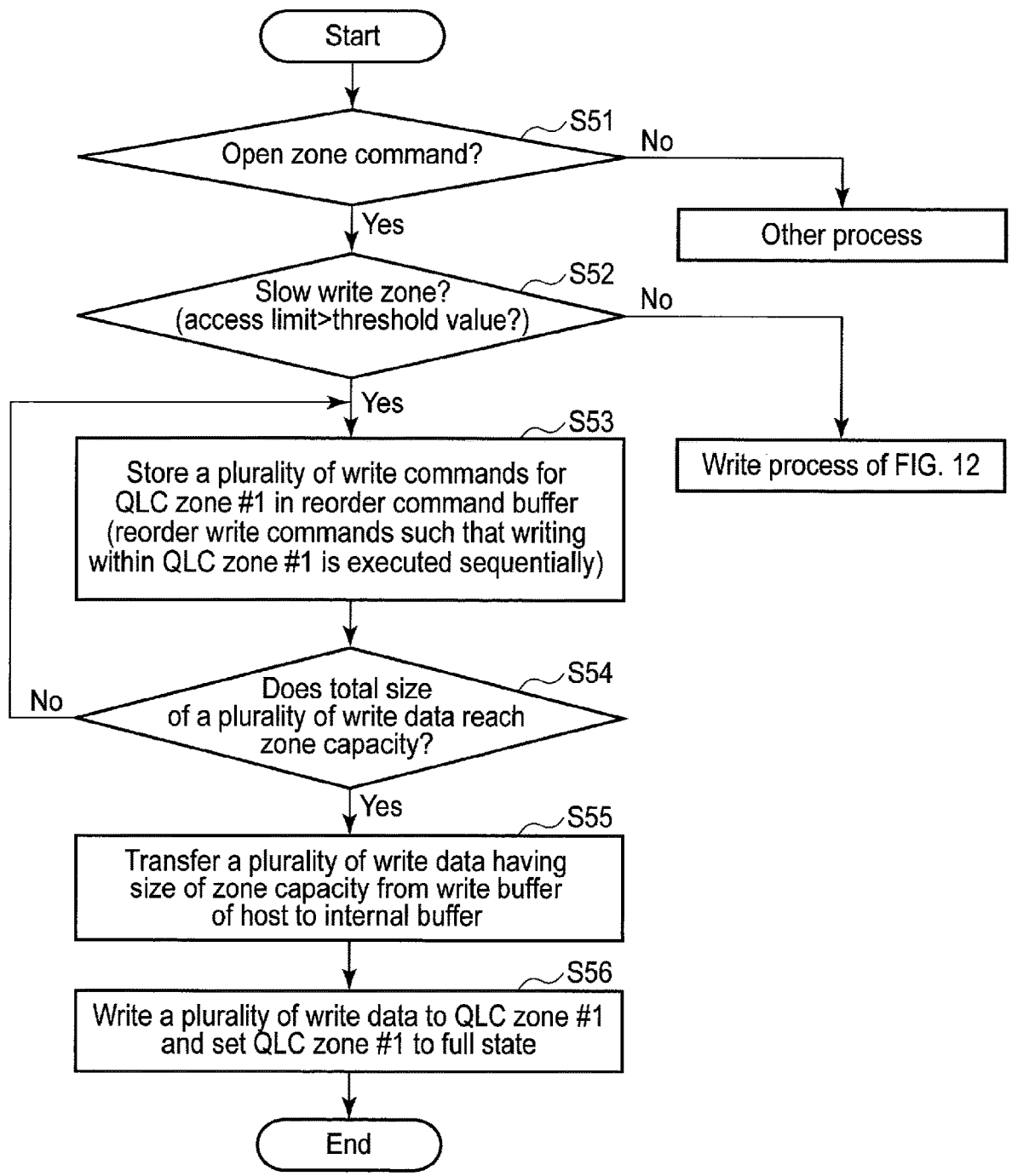
FIG. 16 is a flowchart illustrating a procedure of a write operation of writing data to a zone where a long access limit is specified.

FIG. 16 is a flowchart illustrating a procedure of the write operation of writing data to a zone having a long access limit.

For example, a case where the SSD 3 receives the open zone command specifying the QLC zone #1 from the host 2 is assumed.

When the controller 4 receives the open zone command specifying the QLC zone #1 from the host 2 (YES in step S51), the controller 4 determines whether or not the zone access limit corresponding to the QLC zone #1 is longer than a threshold value, i.e., whether or not the QLC zone #1 is the slow write zone (step S52).

When the zone access limit corresponding to the QLC zone #1 is not longer than this threshold value (NO in step S52), the controller 4 executes the write process to the QLC zone #1 in the same procedure as the write process illustrated in the flowchart of FIG. 12. In this case, the controller 4 may first cause the QLC zone #1 to transition to the open state by executing the erase operation for the QLC zone #1. After that, the controller 4 may start the write process illustrated in the flowchart of FIG. 12.

In contrast, when the zone access limit of QLC zone #1 is longer than the threshold value (YES in step S53), the controller 4 dynamically increases the storage capacity allocated to the reorder command buffer 23-1 such that the writable LBA range of QLC zone #1 determined based on the maximum number of the write commands which can be stored in the reorder command buffer 23-1 reaches the whole LBA range of QLC zone #1, and executes the following process.

That is, the controller 4 receives from the host 2 a plurality of first write commands each specifying the logical address indicative of QLC zone #1, and stores all the plurality of first write commands in the reorder command buffer 23-1 (step S53). In step S53, the controller 4 reorders the plurality of first write commands in the order in which the writing within QLC zone #1 is executed sequentially from the next write location within QLC zone #1 (in this example, starting LBA of QLC zone #1), and maintains the plurality of first write commands reordered in the reorder command buffer 23-1.

The controller 4 determines whether or not the total data size of the plurality of write data associated with the plurality of first write commands reordered reaches the capacity of QLC zone #1 (step S54). The controller 4 repeats the process of step S53 until the total data size of the plurality of write data associated with the plurality of first write commands reordered reaches the capacity of QLC zone #1.

When the total data size of the plurality of write data associated with the plurality of first write commands reordered reaches the capacity of QLC zone #1 (YES in step S54), the controller 4 transfers the plurality of write data having the size of the zone capacity of QLC zone #1 in units of the minimum write size, from the write buffer 61 of the host 2 to the internal buffer 161 (step S55).

In step S55, the controller 4 may first cause the QLC zone #1 to transition to the open state by executing the erase operation for the first storage region (QLC block) used as the QLC zone #1. After that, the controller 4 may transfer the plurality of write data having the size of the zone capacity of QLC zone #1 in units of the minimum write size, from the write buffer 61 of the host 2 to the internal buffer 161.

Then, the controller 4 sets the first storage region used as the QLC zone #1 to the full state in which the whole first storage region is filled with the data, by writing the plurality of write data transferred to the internal buffer 161 to the first storage region used as the QLC zone #1 (step S56).

In the above example, the case where the zone access limit of which the host 2 notifies the controller 4 is indicative of the value (for example, time) of the zone access limit of each zone has been described, but the host 2 may notify the controller 4 of properties on the zone access limit of each zone (for example, "long access limit", "normal access limit", and the like). When a certain zone is the zone where the time elapsed from start of writing to this zone until the whole zone is filled with the data is longer than a threshold value, the host 2 may specify the property of the long access limit to this zone. When a certain zone is the zone where the time elapsed from start of writing to this zone until the whole zone is filled with the data is a threshold value or less, the host 2 may specify the property of the normal access limit to this zone.

That is, when it is specified by the host 2 using the value of the zone access limit or the property on the zone access limit that a certain zone is the zone where the time elapsed from start of writing to this zone until the whole zone is filled with the data is longer than the threshold value, the controller 4 executes the processes in steps S53 to S56 illustrated in FIG. 16.

It has been assumed in the above descriptions that the host 2 can specify the value of the access limit (or the property on the access limit) of the QLC zone to be used but, in some cases, the value of the access limit (or the property on the access limit) of the zone cannot be estimated depending on the application.

When the value of the access limit (or the property on the access limit) of a certain zone is unknown, the controller 4 executes the following process to this zone.

As regards such a zone, first, writing is started in the same manner as that in the case where the access limit falls below the threshold value. After that, when, for example, the time elapsed from start of writing to a certain zone (for example, first zone) reaches the threshold value before the first zone becomes a full state or before receiving the zone finish command, the controller 4 writes dummy data to one first storage region (QLC block) managed as the first zone and thereby sets this first storage region (QLC block) to the state in which the whole first storage region is filled with the data. Then, the controller 4 awaits until the total of (i) the data size of the write data already written to this first storage region, (ii) the data size of remaining write data un-transferred to the internal buffer 161, of the plurality of write data associated with the received first write commands each specifying the first zone, and (iii) the data size of subsequent write data associated with subsequent first write commands specifying the first zone, reaches the capacity of the first zone.

After the total of the data size of the already written write data, the data size of the remaining write data, and the data size of the subsequent write data reaches the capacity of the first zone, the controller 4 reads the already written write data from the one first storage region managed as the first zone, transfers the remaining write data and the subsequent write data from the write buffer 51 of the host 2 to the internal buffer 161, writes, to another first storage region (QLC block) which is to be managed as the first zone, the read already written write data, the remaining write data transferred to the internal buffer 161, and the subsequent write data transferred to the internal buffer 161, and thereby sets the other first storage region (QLC block) to the state in which the whole other first storage region (QLC block) is filled with the data.

Thus, after the time elapsed from start of writing to the first zone reaches the threshold value, writing to the first zone (new first storage region used as the first zone) is not started until the total of the data size of the write data already written to the first zone, the data size of the remaining write data un-transferred to the internal buffer 161, and the data size of subsequent write data associated with subsequent first write commands specifying the first zone, reaches the capacity of the first zone. Therefore, even if it is unclear whether a certain zone is a slow write zone or not, a process of delaying the start of writing to this zone (new first storage region used as thus zone) can be executed when the time elapsed from start of writing to this zone reaches the threshold value.

Alternatively, the controller 4 may write the already written write data, the remaining write data transferred to the internal buffer 161, and the subsequent write data transferred to the internal buffer 161 to the one first storage region (QLC block) where the dummy data is written, instead of writing the already written write data, the remaining write data transferred to the internal buffer 161, and the subsequent write data transferred to the internal buffer 161 to the other first storage region (QLC block). In this case, the controller 4 first copies the already written write data from the one first storage region (QLC block) where the dummy data is written to the SLC buffer 201 and the like, and thereby sets this one first storage region (QLC block) to a state of including no valid data (also referred to as the empty state or the free state). Thus, this one first storage region (QLC block) can be used for writing new data. Then, the controller 4 opens this one first storage region (QLC block), writes the already written write data copied to the SLC buffer 201, the remaining write data transferred to the internal buffer 161, and the subsequent write data transferred to the internal buffer 161 to this one first storage region (QLC block), and thereby sets this one first storage region (QLC block) to the state in which the whole one first storage region (QLC block) is filled with the data.

Alternatively, when the time elapsed from start of writing to the first zone reaches the threshold value, the controller 4 copies the write data already written to one first storage region (QLC block) managed as the first zone from the one first storage region (QLC block) to the SLC buffer 201 and the like, and thereby sets this one first storage region (QLC block) to the state in which the valid data is not stored. After the total of the data size of the already written write data (i.e., the data size of the copied write data), the data size of remaining write data un-transferred to the internal buffer 161, of the plurality of write data associated with the received first write commands each specifying the first zone, and the data size of the subsequent write data associated with the plurality of subsequent first write commands specifying the first zone, reaches the capacity of the first zone, the controller 4 transfers the remaining write data and the subsequent write data from the write buffer 51 of the host 2 to the internal buffer 161. Then, the controller 4 may open this first storage region (QLC block), write the written write data copied to the SLC buffer 201 and the like, the remaining write data transferred to the internal buffer 161, and the subsequent write data to this first storage region, and thereby set this first storage region to the state in which the whole first storage region is filled with the data.

These operations will be specifically explained below.

For example, when the value of the access limit (or the property on the access limit) of QLC zone #1 is unknown, the controller 4 first handles the QLC zone #1 as the zone of the normal access limit, and executes the write process to the QLC zone #1 in the same procedure as that of the write process illustrated in the flowchart of FIG. 12. In this case, the controller 4 may first cause the QLC zone #1 to transition to the open state by executing the erase operation to the QLC zone #1. After that, the controller 4 may start the write process illustrated in the flowchart of FIG. 12.

Then, when the time elapsed from start of writing to the QLC zone 31 reaches a threshold value (zone access limit) before the QLC zone 31 is filled with the write data and becomes the full state, or when the time elapsed from start of writing to the QLC zone 31 reaches the zone access limit but a request (finish zone command) to make the QLC zone #1 transition to the full state is not received from the host 2, the controller 4 makes the QLC zone #1 internally transition in the full state by writing the dummy data to the QLC zone #1.

The controller 4 determines this QLC zone #1 as the slow write zone, i.e., the zone of the long access limit. Then, the controller 4 apparently extends the access limit to the QLC #1 and makes the QLC zone #1 seem to be continuously in the open state as viewed from the host 2 by maintaining each of the subsequent first write commands specifying the QLC zone #1 in the reorder command buffer 23-1.

More specifically, when the host 2 does not issue to the SSD 3 a set of write commands necessary to fill the whole QLC zone #1 or does not issue to the SSD 3 a request (finish zone command) to make the QLC zone #1 transition to the full state until the zone access limit (i.e., the time elapsed from start of the write access to the QLC zone #1 until the whole QLC zone #1 is filled with data) of the QLC zone #1, the controller 4 writes the dummy data to the QLC zone #1 and causes the QLC zone #1 to be internally full state.

That is, the controller 4 writes the dummy data to a first storage region (QLC block) used as the QLC zone #1, and thereby causes the whole first storage region (QLC block) to be filled with the data (the write data already written to the first storage region and the dummy data written to the first storage region). At this time, the controller 4 maintains in the reorder command buffer 23-1 each write command to request writing the write data of the size smaller than the minimum write size or each write command by which the writing within QLC zone #1 cannot be executed sequentially.

Furthermore, the controller 4 continuously executes the process of receiving from the host 2 each of the subsequent first write commands specifying the QLC zone #1, and the process of storing the subsequent first write commands in the reorder command buffer 23-1. The QLC zone #1 thereby seems to be continuously open state as viewed from the host 2.

Next, the controller 4 determines the other first storage region (QLC block) that is to be used as the QLC zone #1. At this time, the controller 4 may obtain the size of the determined other first storage region (QLC block) and may further update the capacity of the QLC zone 31 if necessary such that the capacity of the QLC zone 31 is changed to the size of the other first storage region.

Then, the controller 4 does not start writing to the QLC zone 31, i.e., writing to the other first storage region (QLC block) used as the QLC zone #1 until the total of the data size of the write data already written to the QLC zone #1, and the data size of the write data associated with the plurality of first write commands reordered stored in the reorder command buffer 23-1 reaches the capacity of QLC zone #1 or the controller 4 receives from the host 2 the instruction (finish zone command) to cause the QLC zone #1 to transition to the full state.

When the total of the data size of the write data already written to the QLC zone #1, and the data size of the write data associated with the plurality of first write commands reordered stored in the reorder command buffer 23-1 reaches the capacity of QLC zone #1 or when the controller 4 receives from the host 2 the request (finish zone command) to cause the QLC zone #1 to transition to the full state, the controller 4 reads the write data already written to the QLC zone #1 from the QLC zone 31 which is caused to be internally full state, and transfers the read write data (already written write data) to the internal buffer 161. In this case, more specifically, the controller 4 reads the already written write data from the first storage region (QLC block) which is originally used as the QLC zone #1, and transfers the read already written write data to the internal buffer 161.

Furthermore, the controller 4 transfers all the write data associated with the plurality of first write commands reordered stored in the reorder command buffer 23-1 from the write buffer 51 of the host 2 to the internal buffer 161. The write data associated with the plurality of first write commands reordered include (i) the remaining write data untransferred to the internal buffer 161, of the plurality of write data associated with the received first write commands each specifying the first zone, and (ii) the subsequent write data associated with the plurality of subsequent first write commands specifying the first zone.

When the request (finish zone command) to cause the QLC zone #1 to transition to the full state is received from the host 2 before the total of the data size of the write data already written to the QLC zone #1, and the data size of the write data associated with the plurality of first write commands reordered, stored in the reorder command buffer 23-1 reaches the capacity of QLC zone #1, the total of the data size of the write data already written to the QLC zone #1 and the data size of the write data associated with the plurality of first write commands reordered is below the size necessary to cause the QLC zone #1 to be the full state. Therefore, in this case, the controller 4 transfers the dummy data of short size to the internal buffer 161.

Then, the controller 4 opens another first storage region (QLC block) used as the QLC zone #1, writes all the data transferred to the internal buffer 161 to the other first storage region (QLC block), and thereby sets the other first storage region (QLC block) to be the full state in which the whole other first storage region (QLC block) is filled with the data. After that, the controller 4 manages the other first storage region (QLC block) as the QLC zone #1 in the full state by using the full zone list 103. The first storage region (QLC block) originally used as the QLC zone #1 is released as an empty zone and is used as, for example, the first storage region (QLC block) for the other zone.

Thus, the zone access limit of QLC zone #1 can be extended without extending a period maintained in the state in which the QLC block is partially written (for example, a period from the time when the QLC block is opened to the time when the QLC block becomes the full state).

The controller 4 may increase the size of the reorder command buffer corresponding to the QLC zone in which the zone access limit is to be extended such that the LBA range covered with the reorder command buffer increases to the LBA range of this QLC zone and, instead, may reduce the size of the reorder command buffer corresponding to each of the other QLC zones in which the zone access limit does not need to be extended.

In FIG. 15 described above, the zone access limit specified by the host 2 may be able to specify a specific parameter indicating that the zone access limit is unknown. In this case, the controller 4 can execute the above process to the zone for which the controller 4 is notified that the zone access limit is unknown.

Figure 17:
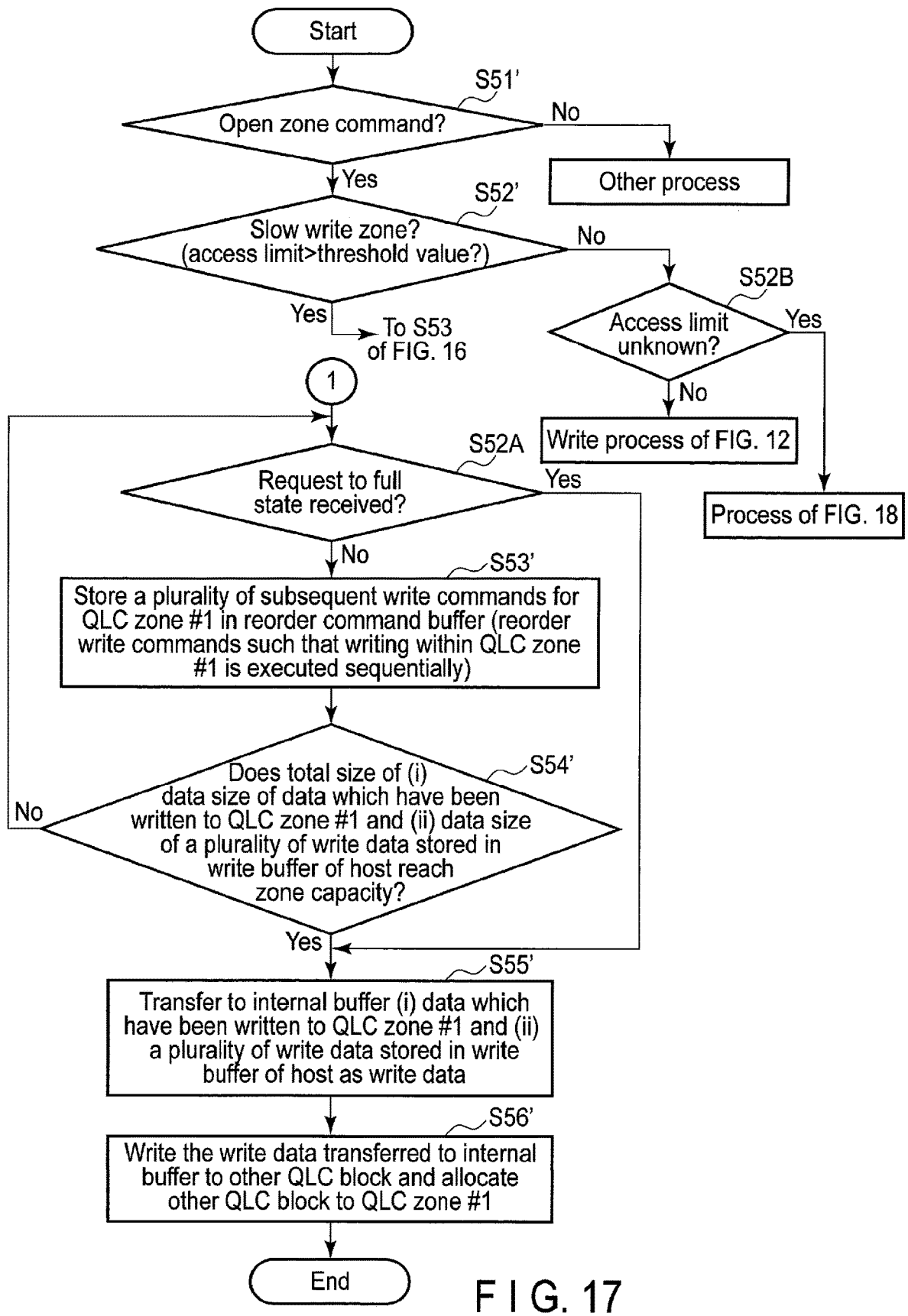
FIG. 17 is a flowchart illustrating a part of a procedure of a write operation of writing data to a zone where it is specified that an access limit is unknown.

FIG. 17 is a flowchart illustrating a procedure of the write operation of writing the data to the zone where it is specified that the zone access limit is unknown.

For example, receiving the open zone command specifying the QLC zone #1 from the host 2 is assumed.

When the controller 4 receives the open zone command specifying the QLC zone #1 from the host 2 (YES in step S51'), the controller 4 determines whether or not the zone access limit corresponding to the QLC zone #1 is longer than a threshold value (i.e., whether the QLC zone #1 is the slow write zone or not) or whether or not the zone access limit is unknown (steps S52' and S52B).

When the zone access limit corresponding to the QLC zone #1 is longer than the threshold value (YES in step S52'), the process proceeds to S53 in the flowchart of FIG. 16.

When the zone access limit corresponding to the QLC zone #1 is not longer than this threshold value (NO in step S52'), the controller 4 determines whether it is specified by the host 2 that the zone access limit of QLC zone #1 is unknown or not (step S52B).

When it is not specified by the host 2 that the zone access limit of QLC zone #1 is unknown (NO in step S52B), i.e., when the zone access limit of QLC zone #1 is the normal zone access limit, the controller 4 executes the write process illustrated in FIG. 12.

When it is specified by the host 2 that the zone access limit of QLC zone #1 is unknown (YES in step S52B), the controller 4 executes a write process illustrated in FIG. 18 instead of executing the write process described with reference to FIG. 12.

Figure 18:
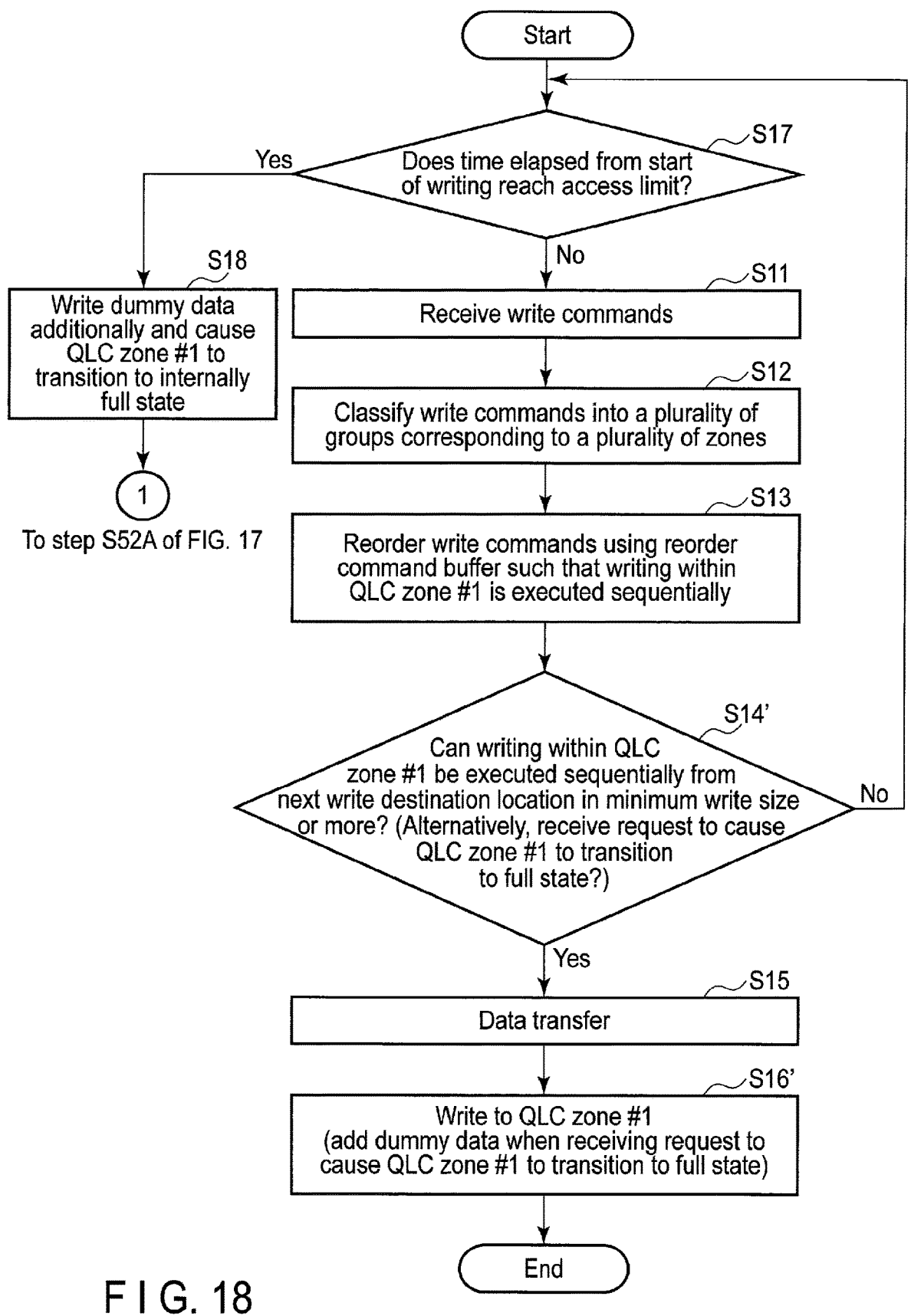
FIG. 18 is a flowchart illustrating remaining parts of the procedure of the write operation of writing data to the zone where it is specified that the access limit is unknown.

A main difference between the write process illustrated in the flowchart of FIG. 18 and the write process illustrated in the flowchart of FIG. 12 is that besides the write process of FIG. 12, the process of step S17 and the process of step S18 are added to the write process of FIG. 18.

In step S17 of FIG. 18, the controller 4 determines whether or not the time elapsed from start of writing of QLC zone #1 reaches the threshold value (access limit) before the QLC zone #1 becomes the full state. The elapsed time is indicative of, for example, the time elapsed after the QLC zone 31 is opened.

The controller 4 executes the processes in steps S11 to S13 illustrated in the flowchart of FIG. 12 until the time elapsed after the QLC zone #1 is opened reaches the access limit, and thereby reorders the plurality of first write commands to write the data to the QLC zone #1 in an order in which the writing within QLC zone #1 is executed sequentially from the next write location within QLC zone #1, by using the reorder command buffer 23-1 corresponding to the QLC zone #1. Then, in step S14' of FIG. 18, the controller 4 determines whether or not the writing within QLC zone #1 can be executed sequentially in equal to or larger than the minimum write size from the next write location within QLC zone #1, or whether or not the controller 4 receives from the host 2 the request (finish zone command) to cause the QLC zone #1 to transition to be the full state. The processes in steps S11 to S13 are repeated until the writing within QLC zone #1 becomes capable of being executed sequentially in equal to or larger than the minimum write size from the next write location within QLC zone #1 or until the request (finish zone command) to cause QLC zone #1 to transition to the full state is received from the host 2.

When the writing within QLC zone #1 becomes capable of being executed sequentially in equal to or larger than the minimum write size from the next write location within QLC zone #1, or when the controller 4 receives from the host 2 the request (finish zone command) to cause the QLC zone #1 to transition to the full state (YES in step S14'), the controller 4 transfers the plurality of write data associated with the plurality of first write commands reordered, from the write buffer 51 of the host 2 to the internal buffer 161, in the same order as the order of the plurality of first write commands reordered, based on the plurality of first write commands reordered (step S15). Then, the controller 4 writes the plurality of write data transferred to the internal buffer 161 to the first storage region (QLC block) used as the QLC zone #1 (step S16'). When each write command to request writing the write data of the size smaller than the minimum write size or each write command by which the writing within QLC zone #1 cannot be executed sequentially exists in the reorder command buffer 23-1, the controller 4 maintains each write command in the reorder command buffer 23-1.

When receiving from the host 2 the request (finish zone command) to cause the QLC zone #1 to transition to the full state, the controller 4 sets the write data of the size which is below the minimum write size to the minimum write size and sets the write data which cannot be written sequentially to the write data which can be written sequentially, by further adding the dummy data, and thereby assures the write data necessary to cause the zone to become the full state. Then, the controller 4 writes the data to the first storage region (QLC block) used as the QLC zone #1, and thereby sets the first storage region (QLC block) used as the QLC zone #1 to the state in which the whole first storage region (QLC block) is filled with the data, in step S16'. As a result, the QLC zone #1 becomes the internally full state.

In steps S14 and S16 of FIG. 12, the processes in steps S14' and S16' illustrated in FIG. 18 may be executed respectively.

In addition, when the host 2 does not transmit any write commands specifying the QLC zone #1, but transmits the zone finish command specifying the QLC zone #1 after the zone #1 is opened, the controller 4 may fill the whole QLC zone #1 with dummy data alone, or may not write the dummy data to the QLC zone #1 and may use the first storage region for the other zone and cause the QLC zone #1 to seem to be logically the full state.

When the time elapsed from start of writing to the QLC zone #1 reaches the threshold value (access limit) while executing the write process of FIG. 18 (YES in step S17), the controller 4 writes dummy data to the first storage region (QLC block) used as the QLC zone #1 and thereby sets the first storage region (QLC block) used as the QLC zone #1 to the state in which the whole first storage region (QLC block) is filled with the data. As a result, the QLC zone #1 becomes the internally full state. When each write command to request writing the write data of the size smaller than the minimum write size or each write command by which the writing within QLC zone #1 cannot be executed sequentially exists in the reorder command buffer 23-1, the controller 4 maintains these write commands in the reorder command buffer 23-1.

In step S18, the controller 4 further determines another first storage region (QLC block) that is to be used as the QLC zone #1. When the size of the other first storage region (QLC block) is different from the size of the first storage region (QLC block) originally used as the QLC zone #1, the controller 4 may change the capacity of QLC zone #1 to the size of the other first storage region (QLC block). When the size of the other first storage region (QLC block) is the same as the capacity necessary to store the received write data from the host 2 or is short, the controller 4 may execute a process of reducing the capacity of QLC zone #1 to the capacity necessary to store the received write data. Then, the controller 4 adds the QLC zone #1 to the full zone list 103 and causes the state of QLC zone #1 to transition to the full state. That is, the controller 4 manages the QLC zone #1 as the QLC zone in the full state such that the host 2 can also recognize the state of QLC zone #1 as the full state.

When the size of the other first storage region (QLC block) is larger than the capacity necessary to store the received write data sent from the host 2 the process proceeds to step S52A of FIG. 17.

In step S52A of FIG. 17, the controller 4 determines whether the request (finish zone command) to cause the QLC zone #1 to transition to the full state is received from the host 2 or not.

When the request (finish zone command) to cause the QLC zone #1 to transition to the full state is not received from the host 2 (NO in step S52A), the controller 4 receives from the host 2 each of the plurality of subsequent first write commands specifying the logical address indicative of QLC zone #1 and stores all the plurality of subsequent first write commands in the reorder command buffer 23-1 (step S53'). In step S53', the controller 4 reorders the plurality of subsequent first write commands in the order in which the writing within QLC zone #1 is executed sequentially from the next write location within QLC zone #1, and maintains the plurality of subsequent first write commands reordered in the reorder command buffer 23-1.

The controller 4 determines whether or not the total (A+B) of the data size (A) of the write data already written to the QLC zone #1 and the data size (B) of the plurality of write data associated with the plurality of first write commands reordered stored in the reorder command buffer 23-1 reaches the capacity of QLC zone #1 (step S54'). When the capacity of QLC zone #1 is changed to a new capacity, it is determined whether or not the total (A+B) reaches the new capacity of QLC zone #1.

The controller 4 repeats the processes in steps S52A and S53' until the total (A+B) of the data size (A) of the write data already written to the QLC zone #1 and the data size (B) of the plurality of write data associated with the plurality of first write commands reordered reaches the capacity of QLC zone #1.

When the total (A+B) of the data size (A) of the write data already written to the QLC zone #1 and the data size (B) of the plurality of write data associated with the plurality of first write commands reordered stored in the reorder command buffer 23-1 reaches the capacity of QLC zone #1 (YES in step S54'), the controller 4 reads the write data already written to the QLC zone #1 from the QLC zone #1 and transfers the read write data (i.e., the already written write data) to the internal buffer 161 in step S55'. In step S55', the controller 4 further transfers all the write data associated with the plurality of first write commands reordered from the write buffer 51 of the host 2 to the internal buffer 161.

In step S55', the controller 4 may first execute the erase operation for the new storage region (i.e., the above-described other first storage region) corresponding to the QLC zone #1. After that, the controller 4 may transfer the plurality of write data having the size of the new zone capacity of QLC zone #1 in units of the minimum write size, from the written QLC zone #1 and the write buffer 61 of the host 2 to the internal buffer 161.

Then, the controller 4 writes all the plurality of write data transferred to the internal buffer 161 to the other first storage region (QLC block) determined to be used as the QLC zone #1 and thereby sets the other first storage region (QLC block) to the full state in which the whole other first storage region (QLC block) is filled with the data (step S56'). In step S56', the controller 4 allocates the other first storage region (QLC block) to the QLC zone #1, adds the QLC zone #1 to the full zone list 103, and causes the state of QLC zone #1 to transition to the full state. That is, the controller 4 manages the QLC zone #1 as the QLC zone in the full state such that the host 2 can also recognize the state of QLC zone #1 as the full state.

In contrast, when receiving from the host 2 the request (finish zone command) to cause the QLC zone #1 to transition to the full state (YES in step S52A), the controller 4 executes the following process.

When the reorder command buffer 23-1 is blank, the controller 4 adds the QLC zone #1 set to be in the internally full state to the full zone list 103, causes the state of QLC zone #1 to transition to the full state, and finishes the process. That is, the controller 4 manages the QLC zone #1 as the QLC zone in the full state such that the host 2 can also recognize the state of QLC zone #1 as the full state.

When the reorder command buffer 23-1 is not empty, the controller 4 executes the process of step S55'. In step S55', the controller 4 reads the write data already written to the QLC zone #1 set to be the internally full state from the QLC zone 31 and transfers the read write data (i.e., the already written write data) to the internal buffer 161. Furthermore, the controller 4 transfers all the write data associated with the plurality of first write commands reordered from the write buffer 51 of the host 2 to the internal buffer 161. Furthermore, the controller 4 transfers to the internal buffer 161 dummy data of the data size necessary to fill the whole other first storage region (QLC block) used as the QLC zone #1 with the data. The dummy data is also used to enable sequential writing.

Then, the controller 4 writes all the data transferred to the internal buffer 161 by the process of step S55' to the other first storage region (QLC block) used as the QLC zone #1 and sets the other first storage region (QLC block) to the full state in which the whole other first storage region (QLC block) is filled with the data (step S56'). In step S56', the controller 4 allocates the other first storage region (QLC block) to the QLC zone #1, adds the QLC zone #1 to the full zone list 103, and causes the state of QLC zone #1 to transition to the full state. That is, the controller 4 manages the QLC zone #1 as the QLC zone in the full state such that the host 2 can also recognize the state of QLC zone #1 as the full state.

In the above example, the QLC zone #1 in which the time elapsed from start of writing reaches the access limit has been set to the internally full state, but the zone may not be set but the controller 4 may copy the already written write data from the QLC zone #1 to the SLC buffer 201 (or the internal buffer 161) and the like and set the first storage region (QLC block) originally used as the QLC zone #1 to be the internally empty state. Then, the controller 4 may write the already written write data copied to the SLC buffer 201, the remaining write data un-transferred to the internal buffer 161, of the write data associated with the received first write commands, and the subsequent write data associated with the subsequent first write commands, to the first storage region (QLC block) set to be the empty state.

In addition, even when the QLC zone #1 in which the time elapsed from start of writing reaches the threshold value (access limit) is set to be the internally full state, the controller 4 may copy the already written write data from the QLC zone #1 set to be the internally full state to the SLC buffer 201 (or the internal buffer 161) and internally reset the QLC zone #1 set to be the internally full state, when executing the writing in step S56'. Then, the controller 4 may write the already written write data copied to the SLC buffer 201, the remaining write data un-transferred to the internal buffer 161, and the subsequent write data associated with the subsequent first write commands, to the internally reset QLC zone #1.

In addition, in the present embodiment, each of the subsequent write commands is stored in the reorder command buffer after the time elapsed from start of writing reaches the access limit but, instead, the write data associated with each of the subsequent write commands may be transferred from the write buffer 51 of the host 2 to the SLC buffer 201 and the like.

In addition, as regards the QLC zone in which the normal access limit is first specified, the controller 4 may have a function of receiving from the host 2 an instruction to start the process of access limit extension when or before the time elapsed from start of writing within the QLC zone reaches the access limit. In this case, the controller 4 executes the same operation as that in the case where the access limit is unknown, after this point of time.

FIG. 19 illustrates an example of a data structure of the zone management table 32.

The zone management table 32 includes a plurality of management regions that correspond to all first storage regions (in this example, QLC zone #1 to QLC zone #n) in the NAND flash memory 5, respectively.

Each of the management regions in the zone management table 32 stores metadata on the QLC zone corresponding to this management region.

For example, the metadata of the management region corresponding to the QLC zone #1 include (1) metadata indicative of a readable area in the QLC zone #1, (2) metadata indicative of the writable LBA range in the QLC zone #1, (3) metadata indicative of a write command un-received area in the QLC zone #1, and (4) metadata indicative of a un-writable area in the QLC zone #1.

The readable area in the QLC zone #1 is indicative of a logical address range where data can be read from the QLC zone #1. A set of LBAs in the QLC zone #1 where a data write oration (fine write operation) is finished is the readable area in the QLC zone #1.

The controller 4 may manage an un-readable pointer (also referred to as URP) indicative of an un-readable minimum address in the QLC block corresponding to the QLC zone #1. URP is indicative of an end of the readable area in the QLC zone #1.

The writable LBA range in the QLC zone #1 is indicative of an LBA range where the writing can be executed by a set of write commands stored in the reorder command buffer corresponding to the QLC zone #1. The length of the writable LBA range is basically defined based on the maximum number of write commands that can be stored in the reorder command buffer corresponding to the QLC zone #1, i.e., the size of the reorder command buffer.

As the writing within QLC zone #1 proceeds, the writable LBA range (i.e., the LBA range covered with the reorder command buffer) in the QLC zone #1 moves in a direction from the lead to the end of the LBA range of QLC zone #1.

The data associated with each LBA belonging to the writable LBA range is data which is un-readable from the QLC zone #1. The metadata corresponding to the QLC zone #1 include storage location information indicative of a storage location where data un-readable from the QLC zone #1 is stored. Each storage location is indicative of the storage location in the SLC buffer 201 or the storage location in the write buffer 51 of the host 2.

The write command un-received area in the QLC zone #1 is indicative of an area in the QLC zone #1 where a write command specifying this area as the offset is still not received. Each sector where the write command is still not received is the write command un-received area.

Each sector located more closely to the end side of QLC zone #1 than to the writable LBA range is managed as the un-writable area.

Figure 20:
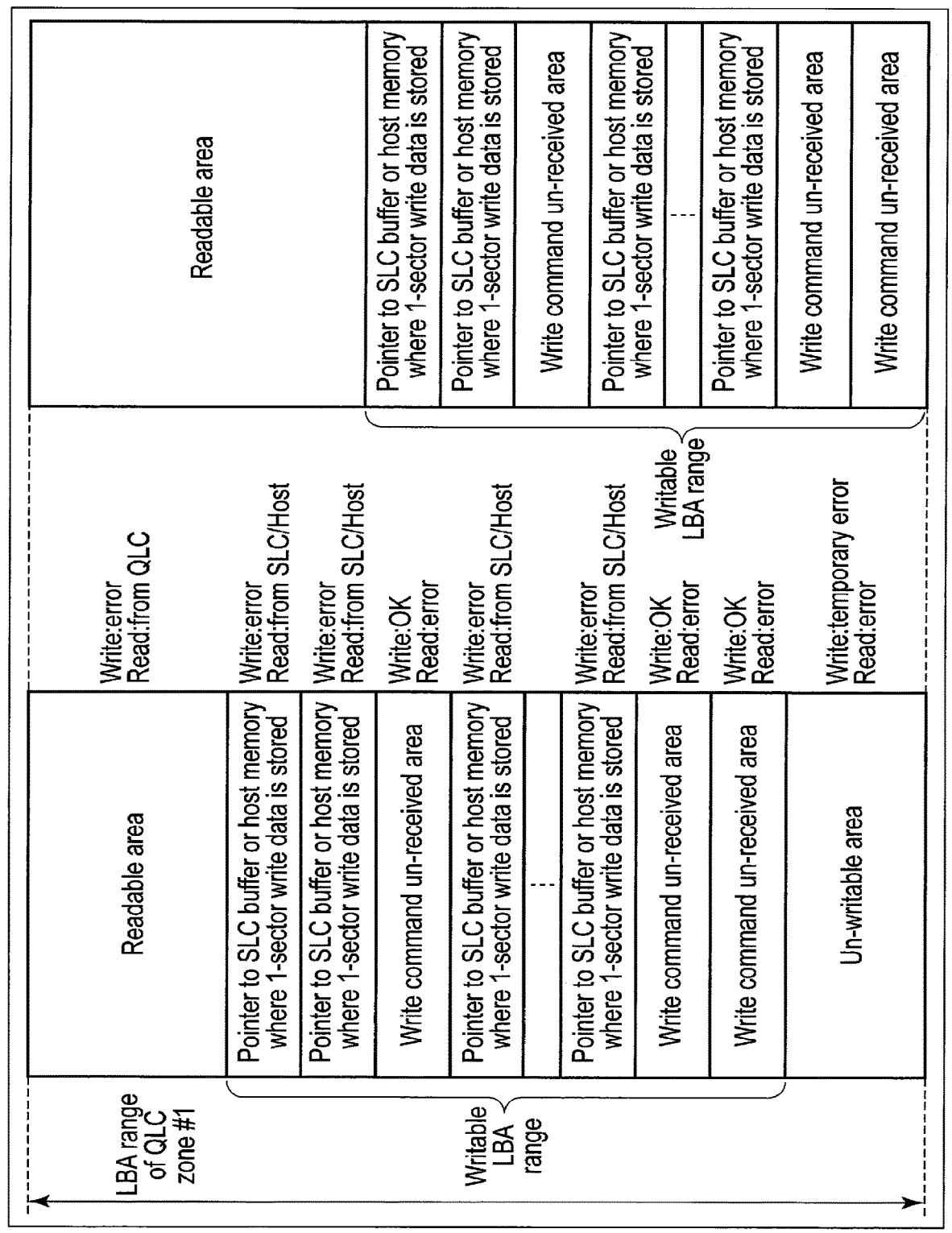
FIG. 20 is a diagram illustrating a readable area, a writable LBA range, and an un-writable area of a zone which is partially written.

FIG. 20 is a diagram illustrating the readable area, the writable LBA range, and the un-writable area of a zone (QLC zone #1) which is partially written.

A left part of FIG. 20 illustrates a state in which the writable LBA range covers a middle part of the LBA range of QLC zone #1. A right part of FIG. 20 is indicative of a state in which when the writing to the QLC zone #1 proceeds, the readable area thereby extends and, consequently, the writable LBA range is moved to the vicinity of the end location of QLC zone #1.

When receiving a new write command to write data to the readable area, the controller 4 transmits to the host 2 a response indicative of an error as a response to this write command. When receiving a read command to read data from the LBA range included in the readable area, the controller 4 reads read target data specified by the received read command from the QLC zone #1.

As regards the writable LBA range, a pointer indicative of each storage location where data (write data) un-readable from the QLC zone #1 is stored is managed in units of sector. When the write data to be written to one certain sector is stored in the SLC buffer 201, the pointer corresponding to this sector is indicative of a storage location in the SLC buffer 201 where this write data is stored. When the write data to be written to one certain sector is stored in the host memory (i.e., the write buffer 51 of the host 2), the pointer corresponding to this sector is indicative of a storage location in the write buffer 51 of the host 2 where this write data is stored.

When receiving a new write command to write the data to a sector where the pointer exists, the controller 4 transmits to the host 2 a response indicative of an error as a response to this write command. When receiving the read command to read the data from the sector where the pointer exists, the controller 4 reads the read target data specified by the received read command from a storage location (i.e., the storage location in the SLC buffer 201 or the write buffer 51 of the host 2) indicated by this pointer.

No pointer exists in each write command un-received area. When receiving from the host 2 the write command to write the data to the write command un-received area, the controller 4 stores this write command in the reorder command buffer corresponding to the QLC zone #1.

When receiving the write command to write the data to the un-writable area located more closely to the end side of QLC zone #1 than to the writable LBA range, the controller 4 transmits to the host 2 a response indicative of a temporary error as a response to this write command. When receiving from the SSD 3 the response indicative of a temporary error to a certain write command, the host 2 is permitted to issue again this write command to the SSD 3. This is because when the writing within QLC zone #1 proceeds, the un-writable area becomes the write command un-received area in the writable LBA range.

When receiving the read command to read the data from the LBA range in the un-writable area, the controller 4 transmits to the host 2 a response indicative of an error as a response to this read command.

Figure 21:
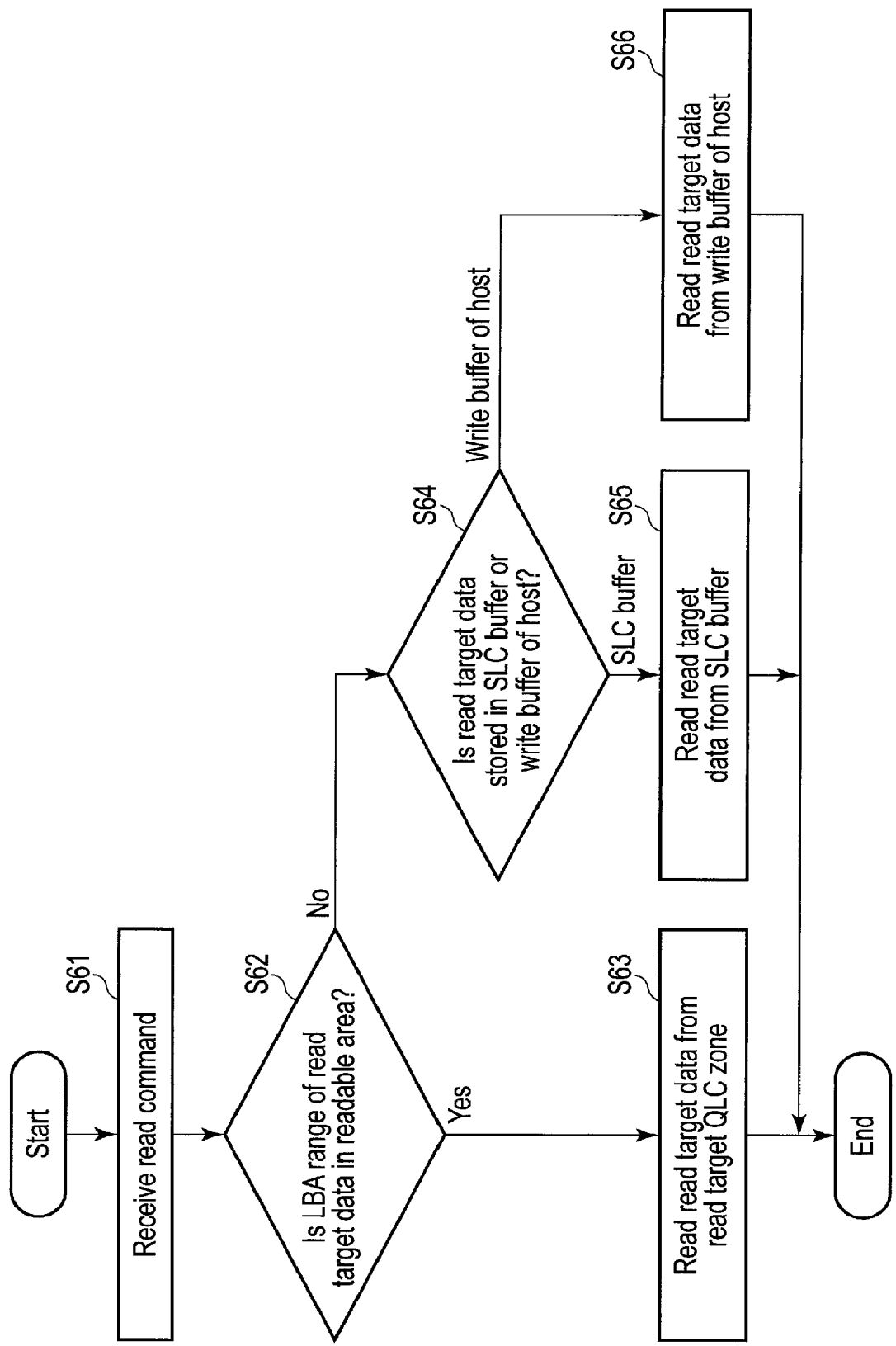
FIG. 21 is a flowchart illustrating a procedure of a read operation executed in the memory system according to the embodiment.

FIG. 21 is a flowchart illustrating a procedure of the read operation executed in the SSD 3.

When receiving from the host 2 a read command specifying (i) the logical address indicative of both the QLC zone (read target QLC zone) and the offset within the read target QLC zone, and (ii) the data size of the read target data (step S61), the controller 4 determines whether or not the LBA range corresponding to the read target data is included in the readable area of the QLC zone (step S62).

When the LBA range corresponding to the read target data is included in the readable area of the read target QLC zone (YES in step S62), the controller 4 reads the read target data from the read target QLC zone and transmits the read target data to the host 2 (step S63).

When the LBA range corresponding to the read target data is not included in the readable area of the read target QLC zone (NO in step S62), the controller 4 determines which of the SLC buffer 201 and the write buffer 51 of the host 2 the read target data is stored in, based on the storage location information (pointers) indicative of the storage location where the data to be written to each sector of the writable LBA range of the read target QLC zone is stored (step S64).

When the read target data is stored in the SLC buffer 201 ("SLC buffer" in step S64), the controller 4 reads the read target data from the storage location in the SLC buffer 201 on the basis of the storage location information, and transmits the read target data to the host 2 (step S65).

When the read target data is stored in the write buffer 51 ("write buffer of the host" in step S64), the controller 4 reads, on the basis of the storage location information, the read target data from the storage location in the write buffer 51 of the host 2 where the read target data is stored, and transmits the read target data to the host 2 (step S66).

As described above, according to the present embodiment, the controller 4 reorders the plurality of first write commands each specifying (i) the logical address indicative of both the first zone and the offset within the first zone where the write data is to be written, (ii) the data size of the write data, and (iii) the location in the write buffer 51 of the host 2 where the write data is stored, in the order in which the writing within the first zone is executed sequentially from the next write location within the first zone, by using the first command buffer corresponding to the first zone. When the writing within the first zone can be executed sequentially in equal to or larger than the minimum write size from the next write location, by reordering the plurality of first write commands, the controller 4 transfers the plurality of write data associated with the plurality of first write commands reordered, from the write buffer 51 of the host 2 to the internal buffer 161, in the same order as the order of the plurality of first write commands reordered.

The order of transferring the plurality of write data to the internal buffer 161 matches the order in which the writing within the first zone can be executed sequentially from the next write location within the first zone. Therefore, the controller 4 can rapidly start the writing of each write data transferred to the internal buffer 161. Therefore, it is possible to prevent the internal buffer 161 from being occupied for a long time by the write data that are to be written to locations different from the next write location within the first zone, and the total size of the buffer which needs to be provided in the SSD 3 can be reduced. Furthermore, the writing within each zone can be executed even if the host 2 does not strictly manage the order of issuing the write commands to the same zone.

In addition, according to the present embodiment, after the total of the data sizes of the plurality of write data associated with the plurality of first write commands reordered reaches the capacity of the first zone, the controller 4 starts transferring the plurality of write data from the write buffer 51 of the host 2 to the internal buffer 161, writes the plurality of write data transferred to the internal buffer 161 to one of the plurality of first storage regions that is managed as the first zone, and thereby sets this first storage region in the state in which the whole first storage region is filled with the data.

Thus, the zone access limit (i.e., the limit time elapsed from start of write access to the QLC zone until this QLC zone is set to be the full state) of the QLC zone corresponding to the first storage region (QLC block) can be extended without extending a period maintained in the state in which the first storage region (QLC block) is partially written (for example, a period elapsed after the first storage region (QLC block) is opened until the first storage region becomes the full state).

The write buffer 51 of the host 2 may be implemented by a nonvolatile write buffer. The nonvolatile write buffer may be implemented by a nonvolatile memory such as a storage class memory (SCM).

When the write buffer 51 of the host 2 is implemented by the nonvolatile write buffer, and even when the data in the internal buffer 161 are lost by power loss such as power failure, the data can be acquired again from the nonvolatile write buffer of the host 2. Therefore, even if the SSD 3 does not comprise a capacitor (or a battery) for executing a power loss protection function, it is possible to prevent the data in the internal buffer 161 from being lost due to power loss.

In addition, in the present embodiment, it has been described that the SLC buffer 201 is used as the storage region to store the remaining write data to be written to the QLC zone caused to transition to be the close state, but a nonvolatile write buffer such as a storage class memory (SCM) may be used as a storage region to store the remaining write data which are to be written the QLC zone caused to transition to the close state.

In addition, basically, when each of a plurality of first storage regions has a recording density higher than a second storage region and when the write speed of the second storage region is higher than the write speed of each of the first storage regions, the same advantages as those of the present embodiment can be achieved. For this reason, an aspect of writing the data in a write mode of writing m bits per memory cell to each of the plurality of first storage regions, and writing the data in a write mode of writing n bits (n<m) per memory cell to the second storage region may be employed. In this example, n is an integer of 1 or more and m is an integer larger than n.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller electrically connected to the nonvolatile memory and configured to manage a plurality of first storage regions included in the nonvolatile memory as a plurality of zones to which a plurality of logical address ranges obtained by dividing a logical address space for accessing the memory system are assigned respectively, wherein
the controller is configured to:
receive a plurality of first write commands from the host, each of the plurality of first write commands specifying (i) a logical address indicative of both a first zone of the plurality of zones and an offset within the first zone to which write data is to be written, (ii) a data size of the write data, and (iii) a location in a write buffer of the host where the write data is stored;
reorder the plurality of first write commands in an order in which writing within the first zone is executed sequentially from a next write location within the first zone, by using a first command buffer corresponding to the first zone, based on the offset and the data size specified by each of the plurality of first write commands; and
when the writing within the first zone becomes capable of being executed sequentially in equal to or larger than a minimum write size of each first storage region from the next write location within the first zone, by reordering the plurality of first write commands, transfer a plurality of write data associated with the plurality of first write commands reordered, from the write buffer of the host to an internal buffer of the memory system, in a same order as the order of the plurality of first write commands reordered, and
write the plurality of write data transferred to the internal buffer to a first storage region, of the plurality of first storage regions, which is managed as the first zone.

2. The memory system of claim 1, wherein
the controller is configured to:
determine whether or not conditions that a lead of contiguous logical addresses determined by the offset and the data size specified by each of the plurality of first write commands reordered matches the next write location and that a data size corresponding to the contiguous logical addresses is equal to or larger than the minimum write size, are satisfied; and when the conditions are satisfied, transfer the plurality of write data associated with the plurality of first write commands reordered, from the write buffer of the host to the internal buffer of the memory system, in the same order as the order of the plurality of first write commands reordered, based on the plurality of first write commands reordered.

3. The memory system of claim 1, wherein the controller is further configured to:

when write data associated with one of the plurality of first write commands is written to the first storage region, transmit to the host a response indicative of a completion of the one of the plurality of first write commands.

4. The memory system of claim 1, wherein the controller is further configured to:

when receiving one of the plurality of first write commands from the host, transmit to the host a first response indicative of completion of a reception of the one of the plurality of first write commands, and when writing of write data associated with the one of the plurality of first write commands to the nonvolatile memory is completed, transmit to the host a second response indicative of a completion of writing corresponding to the one of the plurality of first write commands.

5. The memory system of claim 1, wherein the controller is further configured to:

when it is specified by the host that the first zone is a zone where a time period from a time when writing to the first zone is started to a time when the whole first zone is filled with data is longer than a threshold value, start transfer of the plurality of write data from the write buffer of the host to the internal buffer, after a total of data size of the plurality of write data associated with the plurality of first write commands reordered reaches a capacity of the first zone; and set the first storage region to be in a state in which the whole first storage region is filled with data, by writing the plurality of write data transferred to the internal buffer to the first storage region.

6. The memory system of claim 5, wherein the controller is further configured to cause the first zone to transition to an open state by executing an erase operation to the first storage region, after the total of the data size of the plurality of write data associated with the plurality of first write commands reordered reaches the capacity of the first zone.

7. The memory system of claim 1, wherein the controller is further configured to:

when a time elapsed from start of writing to the first zone reaches a threshold value, set the first storage region to a state in which the whole first storage region is filled with data, by writing dummy data to the first storage region, and after a total of (i) a data size of write data already written to the first storage region, (ii) a data size of remaining write data un-transferred to the internal buffer, of write data associated with a plurality of received first write commands each specifying a logical address indicative of the first zone, and (iii) a data size of subsequent write data associated with a plurality of subsequent first write commands specifying the logical address indicative of the first zone reaches a capacity of the first zone, read the write data already written to the first storage region from the first storage region;

transfer the remaining write data and the subsequent write data from the write buffer of the host to the internal buffer; and set another first storage region, which is to be managed as the first zone, to be in a state in which the whole other first storage region is filled with data, by writing, to other first storage region, the read write data, the remaining write data transferred to the internal buffer, and the subsequent write data transferred to the internal buffer.

8. The memory system of claim 1, wherein the controller is configured to:

when a time elapsed from start of writing to the first zone reaches a threshold value, set the first storage region to a state in which the whole first storage region is filled with data, by writing dummy data to the first storage region, and after a total of (i) a data size of write data already written to the first storage region, (ii) a data size of remaining write data un-transferred to the internal buffer, of write data associated with a plurality of received first write commands each specifying a logical address indicative of the first zone, and (iii) a data size of subsequent write data associated with a plurality of subsequent first write commands specifying the logical address indicative of the first zone reaches a capacity of the first zone, set the first storage region to be in a state in which valid data is not stored, by copying the write data already written to the first storage region from the first storage region to another storage region in the nonvolatile memory;

transfer the remaining write data and the subsequent write data from the write buffer of the host to the internal buffer; and set the first storage region to be in a state in which the whole first storage region is filled with data, by writing, to the first storage region, the write data copied to the other storage region, the remaining write data transferred to the internal buffer, and the subsequent write data transferred to the internal buffer.

9. The memory system of claim 1, wherein the controller is further configured to:

when a time elapsed from start of writing to the first zone reaches a threshold value, set the first storage region to a state in which valid is not stored, by copying write data already written to the first storage region from the first storage region to another storage region in the nonvolatile memory, and after a total of (i) a data size of the copied write data, (ii) a data size of remaining write data un-transferred to the internal buffer, of write data associated with a plurality of received first write commands each specifying a logical address indicative of the first zone, and (iii) a data size of subsequent write data associated with a plurality of subsequent first write commands specifying the logical address indicative of the first zone reaches a capacity of the first zone, transfer the remaining write data and the subsequent write data from the write buffer of the host to the internal buffer; and set the first storage region to be in a state in which the whole first storage region is filled with data, by writing, to the first storage region, the copied write data, the remaining write data transferred to the internal buffer, and the subsequent write data to the first storage region.

10. The memory system of claim 1, wherein
the controller is configured to write data to each of the plurality of first storage regions included in the nonvolatile memory, in a first write mode of writing a plurality of bits per memory cell.

11. The memory system of claim 1, wherein
the controller is further configured to:
write the plurality of write data to the first storage region in a first write mode of writing m-bit per memory cell; and
in response to receiving from the host a first request to cause the first zone to transition to a close state in which writing is suspended,
transfer remaining write data un-transferred to the internal buffer, of a plurality of write data associated with the received first write commands each specifying the first zone, from the write buffer of the host to the internal buffer, and write the remaining write data transferred to the internal buffer to a second storage region included in the nonvolatile memory in a second write mode of writing n-bit per memory cell, where n is an integer of 1 or more and m is an integer larger than n.

12. The memory system of claim 11, wherein
the controller is further configured to:
manage (i) a first logical address range where data is readable from the first zone and (ii) storage location information indicative of each storage location where data un-readable from the first zone is stored, each storage location indicating any one of a storage location in the second storage region and a storage location in the write buffer of the host; and
in response to receiving from the host a read command specifying a logical address indicative of both the first zone and an offset within the first zone, and a data size of a read target data,
when a logical address range corresponding to the read target data is included in the first logical address range,
read the read target data from the first storage region, and transmit the read target data to the host; and
when the logical address range corresponding to the read target data is not included in the first logical address range,
read the read target data from the second storage region or the write buffer of the host, based on the storage location information, and transmit the read target data to the host.

13. The memory system of claim 1, wherein
the controller is further configured to:
manage a logical address range determined based on a maximum number of write commands that are capable of being stored in the first command buffer, as a writable logical address range of the first zone; and
when receiving a write command specifying as an offset a logical address located to an end side of the first zone than the writable logical address range,
transmit to the host a response indicative of a temporary error as a response to the received write command without storing the received write command in the first command buffer.

14. A method of controlling a memory system comprising a nonvolatile memory, the method comprising:
managing a plurality of first storage regions included in the nonvolatile memory as a plurality of zones to which a plurality of logical address ranges obtained by dividing a logical address space for accessing the memory system are assigned respectively;

receiving a plurality of first write commands from a host, each of the plurality of first write commands specifying (i) a logical address indicative of both a first zone of the plurality of zones and an offset within the first zone to which write data is to be written, (ii) a data size of the write data, and (iii) a location in a write buffer of the host where the write data is stored;
reordering the plurality of first write commands in an order in which writing within the first zone is executed sequentially from a next write location within the first zone, by using a first command buffer corresponding to the first zone, based on the offset and the data size specified by each of the plurality of first write commands; and
when the writing within the first zone becomes capable of being executed sequentially in equal to or larger than a minimum write size of each first storage region from the next write location within the first zone, by reordering the plurality of first write commands,
transferring a plurality of write data associated with the plurality of first write commands reordered from the write buffer of the host to an internal buffer of the memory system, in a same order as the order of the plurality of first write commands reordered, and
writing the plurality of write data transferred to the internal buffer to a first storage region, of the plurality of first storage regions, which is managed as the first zone.

15. The method of claim 14, further comprising:
determining whether or not conditions that a lead of contiguous logical addresses determined by the offset and the data size specified by each of the plurality of first write commands reordered matches the next write location and that a data size corresponding to the contiguous logical addresses is equal to or larger than the minimum write size, are satisfied; and
when the conditions are satisfied, transferring the plurality of write data associated with the plurality of first write commands reordered, from the write buffer of the host to the internal buffer of the memory system, in the same order as the order of the plurality of first write commands reordered, based on the plurality of first write commands reordered.

16. The method of claim 14, further comprising:
when write data associated with one of the plurality of first write commands is written to the first storage region, transmitting to the host a response indicative of a completion of the one of the plurality of first write commands.

17. The method of claim 14, further comprising:
when receiving one of the plurality of first write commands from the host, transmitting to the host a first response indicative of completion of a reception of the one of the plurality of first write commands; and
when writing of write data associated with the one of the plurality of first write commands to the nonvolatile memory is completed,
transmitting to the host a second response indicative of a completion of writing corresponding to the one of the plurality of first write commands.

18. The method of claim 14, further comprising:
when it is specified by the host that the first zone is a zone where a time period from a time when writing to the first zone is started to a time when the whole first zone is filled with data is longer than a threshold value,
starting transfer of the plurality of write data from the write buffer of the host to the internal buffer, after a total of data size of the plurality of write data associated with the plurality of first write commands reordered reaches a capacity of the first zone; and setting the first storage region to be in a state in which the whole first storage region is filled with data, by writing the plurality of write data transferred to the internal buffer to the first storage region.

19. The method of claim 18, further comprising:

causing the first zone to transition to an open state by executing an erase operation to the first storage region, after the total of the data size of the plurality of write data associated with the plurality of first write commands reordered reaches the capacity of the first zone.

20. The method of claim 14, further comprising:

when a time elapsed from start of writing to the first zone reaches a threshold value, setting the first storage region to a state in which the whole first storage region is filled with data, by writing dummy data to the first storage region, and after a total of (i) a data size of write data already written to the first storage region, (ii) a data size of remaining write data un-transferred to the internal buffer, of write data associated with a plurality of received first write commands each specifying a logical address indicative of the first zone, and (iii) a data size of subsequent write data associated with a plurality of subsequent first write commands specifying the logical address indicative of the first zone reaches a capacity of the first zone, reading the write data already written to the first storage region from the first storage region;

transferring the remaining write data and the subsequent write data from the write buffer of the host to the internal buffer; and setting another first storage region, which is to be managed as the first zone, to be in a state in which the whole other first storage region is filled with data, by writing, to other first storage region, the read write data, the remaining write data transferred to the internal buffer, and the subsequent write data transferred to the internal buffer.

* * * * *